(12) United States Patent
Cremona et al.

(10) Patent No.: US 11,429,096 B2
(45) Date of Patent: *Aug. 30, 2022

(54) "V" SHAPED AND WIDE PLATOON FORMATIONS

(71) Applicant: Bendix Commercial Vehicle Systems LLC, Elyria, OH (US)

(72) Inventors: Michael D Cremona, Elyria, OH (US); Thomas J Hayes, Elyria, OH (US); Phillip J Kasper, Elyria, OH (US)

(73) Assignee: BENDIX COMMERCIAL VEHICLE SYSTEMS LLC, Avon, OH (US)

( * ) Notice: Subject to any disclaimer, the term of this patent is extended or adjusted under 35 U.S.C. 154(b) by 47 days.

This patent is subject to a terminal disclaimer.

(21) Appl. No.: 16/450,359

(22) Filed: Jun. 24, 2019

(65) Prior Publication Data
US 2019/0310625 A1   Oct. 10, 2019

Related U.S. Application Data

(63) Continuation of application No. 15/395,214, filed on Dec. 30, 2016, now Pat. No. 10,372,123.

(51) Int. Cl.
 G05D 1/00 (2006.01)
 G08G 1/00 (2006.01)
 (Continued)

(52) U.S. Cl.
 CPC .......... G05D 1/0027 (2013.01); G01S 19/13 (2013.01); G05D 1/0295 (2013.01); G08G 1/22 (2013.01)

(58) Field of Classification Search
 CPC ...... G05D 1/0027; G05D 1/0295; G08G 1/22; G01S 19/13
 See application file for complete search history.

(56) References Cited

U.S. PATENT DOCUMENTS 2,781,119 A    7/1998 Yamashita
5,781,119 A *  7/1998 Yamashita ............. G05D 1/024
                                          180/168
(Continued)

FOREIGN PATENT DOCUMENTS

CN    1166420 A    12/1997
CN  101859494 A    10/2010
(Continued)

OTHER PUBLICATIONS

"A survey of inter-vehicle communication protocols and their applications;" T.L. Willke; P. Tientrakool; N.F. Maxemchuk; IEEE Communications Surveys & Tutorials (vol. 11, Issue: 2, pp. 3-20); Jul. 13, 2009.*

(Continued)

*Primary Examiner* — Khoi H Tran
*Assistant Examiner* — Jorge O Peche
(74) *Attorney, Agent, or Firm* — Tucker Ellis LLP

(57) ABSTRACT

Platoon management control systems and methods rearrange three of more vehicles cooperatively travelling seriatim as a platoon along an associated roadway into a platoon arrangement other than the linear or single file formation. Multi roadway lane platoon management control systems and methods control the three or more vehicles cooperatively travelling as a multi-lane platoon along an associated multi-lane roadway into a platoon arrangement other than the linear or single file formation. Larger platoon sizes are provided thereby enabling more vehicles to participate in the larger multi-lane platoon. A platoon management control uses a combination of the GPS position of the lead vehicle representative of the position of the vehicle relative to the associated geographical area, and braking performance data representative of the braking capabilities of following (Continued)

vehicles to rearrange the vehicles into the non-columnar formation.

21 Claims, 16 Drawing Sheets

(51) Int. Cl.
  *G05D 1/02* (2020.01)
  *G01S 19/13* (2010.01)

(56) References Cited

U.S. PATENT DOCUMENTS

| | | | |
|---|---|---|---|
| 5,921,708 A | 7/1999 | Grundl et al. | |
| 8,577,586 B2* | 11/2013 | Niki | G08G 1/22 701/118 |
| 8,717,192 B2* | 5/2014 | Durekovic | G08G 1/164 340/903 |
| 8,738,238 B2 | 5/2014 | Rekow | |
| 9,616,743 B1* | 4/2017 | Mays | B60W 10/30 |
| 9,632,507 B1 | 4/2017 | Korn | |
| 9,940,840 B1* | 4/2018 | Schubert | B60F 1/00 |
| 10,073,464 B2* | 9/2018 | Pilkington | B60W 30/165 |
| 2004/0068416 A1* | 4/2004 | Solomon | G05D 1/0088 446/454 |
| 2004/0193372 A1* | 9/2004 | MacNeille | G08G 1/163 701/468 |
| 2004/0793372 | 9/2004 | MacNeille | |
| 2005/0273258 A1* | 12/2005 | MacNeille | G01S 5/0072 701/300 |
| 2006/0155427 A1 | 7/2006 | Yang | |
| 2007/0164896 A1* | 7/2007 | Suzuki | G01S 7/0232 342/70 |
| 2010/0256835 A1 | 10/2010 | Mudalige | |
| 2010/0256852 A1* | 10/2010 | Mudalige | G08G 1/22 701/24 |
| 2013/0030606 A1* | 1/2013 | Mudalige | G05D 1/0293 701/2 |
| 2013/0124064 A1* | 5/2013 | Nemoto | B60K 31/0058 701/96 |
| 2013/0218365 A1* | 8/2013 | Caveney | G05D 1/0295 701/1 |
| 2013/0342368 A1* | 12/2013 | Nathanson | H04L 41/0213 340/903 |
| 2014/0316671 A1* | 10/2014 | Okamoto | G08G 1/22 701/96 |
| 2014/0316865 A1* | 10/2014 | Okamoto | G05D 1/0293 705/14.1 |
| 2015/0154871 A1* | 6/2015 | Rothoff | B60W 30/00 701/2 |
| 2016/0019782 A1* | 1/2016 | Alam | B60W 30/18163 340/905 |
| 2016/0171894 A1* | 6/2016 | Harvey | G05D 1/0293 701/23 |
| 2017/0011633 A1* | 1/2017 | Boegel | B60W 30/18163 |
| 2017/0227972 A1* | 8/2017 | Sabau | G08G 1/22 |
| 2017/0249844 A1 | 8/2017 | Perkins | |
| 2017/0293296 A1* | 10/2017 | Stenneth | G06Q 20/10 |
| 2017/0344023 A1* | 11/2017 | Laubinger | B60W 50/14 |
| 2017/0349176 A1* | 12/2017 | Alden | G07C 5/085 |
| 2017/0369062 A1* | 12/2017 | Saigusa | B60W 30/16 |
| 2017/0369067 A1* | 12/2017 | Saigusa | B60W 30/18163 |
| 2018/0056998 A1* | 3/2018 | Benosman | B60W 30/095 |
| 2018/0120861 A1* | 5/2018 | Saxena | G05D 1/0291 |
| 2018/0188745 A1* | 7/2018 | Pilkington | G05D 1/0276 |
| 2018/0188746 A1* | 7/2018 | Lesher | G08G 1/22 |
| 2018/0190119 A1* | 7/2018 | Miller, Jr | G08G 1/166 |
| 2018/0211546 A1* | 7/2018 | Smartt | G08G 1/161 |
| 2018/0253976 A1* | 9/2018 | Inam | G08G 1/096708 |
| 2019/0025857 A1* | 1/2019 | Luckevich | G05D 1/0295 |
| 2019/0035269 A1* | 1/2019 | Donovan | G05D 1/0293 |
| 2019/0051188 A1* | 2/2019 | Moustafa | G08G 1/22 |
| 2019/0171227 A1* | 6/2019 | Sujan | B60W 10/06 |
| 2020/0193837 A1* | 6/2020 | Grolle | B60Q 1/50 |
| 2020/0349850 A1* | 11/2020 | Park | B60W 30/165 |
| 2021/0026373 A1* | 1/2021 | Jamison | G05D 1/0223 |

FOREIGN PATENT DOCUMENTS

| | | |
|---|---|---|
| CN | 102282598 A | 12/2011 |
| CN | 102292752 A | 12/2011 |
| CN | 103403639 A | 11/2013 |
| CN | 105160865 A | 12/2015 |
| CN | 105279958 | 1/2016 |
| CN | 105416289 A | 3/2016 |
| CN | 105774800 A | 7/2016 |
| DE | 19722292 B4 | 8/2016 |
| EP | 2881926 A1 | 6/2015 |
| KR | 102227594 B1 | 3/2014 |
| WO | WO 2018/126120 A1 * | 4/2018 |
| WO | WO 2019/133470 A1 * | 4/2019 |
| WO | WO 2019/133476 A1 * | 4/2019 |

OTHER PUBLICATIONS

"Automated vehicle control developments in the PATH program;" S.E. Shladover; C.A. Desoer; J.K. Hedrick; M. Tomizuka; J. Walrand; W.-B. Zhang; D.H. McMahon; H. Peng; S. Sheikholeslam; N. McKeown; IEEE Transactions on Vehicular Technology (vol. 40, Issue: 1, pp. 114-130); Feb. 1, 1991.*

Madeleine El-Zaher, "Vehicle Platoon Control with Multi-Configuration Ability", Elsevier, Science Direct, Procedia Computer Science, Jun. 2012.

Shigang Cui, "Research on Method of Multi-Agent Formation Control", IEEE, 2010.

Yunji Wang, "Tradjectory Planning for an Unmanned Group Vehicle Group Using Augmented Particle Swarm Optimization in a Dynamic Environment", IEEE, Oct. 2009.

E. Pruner, D. Necsulescu, "Control of Decentralized Geometric Formations of Mobile Robots", IEEE, 2012.

Anh Duc Dang, "Formation Conlrol of Autonomous Robots Following Desired Formation During Tracking a Moving Target", IEEE, 2015.

International Search Report and Written Opinion corresponding to International Application No. PCT/US2017/068734, dated Apr. 20, 2018, 14 pages.

US Office Action from related U.S. Appl. No. 15/395,160, dated Oct. 13, 2017.

International Preliminary Report on Patentability for corresponding international application No. PCT/US2017/068734, dated Jul. 2, 2019. 8 Pages.

Office Action from corresponding Chinese Application No. 201780081720.7 dated Apr. 26, 2021.

Korean Written Opinion dated May 29, 2020 for Application Serial No. 10-2019-7022372.

Chinese Office Action dated Nov. 25, 2021 for Application Serial No. 201780081720.

Chinese Office Action dated Feb. 14, 2022 for Application Serial No. 201780081720.

Korean Search Opinion dated Aug. 28, 2020 for Application Serial No. 10-2019-7022372.

European Office Action dated Nov. 29, 2021 for Application Serial No. 17832872.

Indian Office Action dated Oct. 18, 2021 for Application Serial No. 201917025921.

* cited by examiner

"V" SHAPED AND WIDE PLATOON FORMATIONS

TECHNICAL FIELD

The embodiments herein relate generally to highway vehicle platoon management. More specifically, particular embodiments relate to commercial highway vehicle platoon management where it is desirable to rearrange three of more vehicles cooperatively travelling seriatim as a platoon along an associated roadway into a platoon arrangement other than the linear or single file formation. Although the embodiments will be described with reference to selected particular examples, it is to be appreciated that the claimed invention is also amenable to other applications and can be equivalently extended to other embodiments and environments.

CROSS REFERENCE TO RELATED APPLICATIONS

This application is a continuation of U.S. application Ser. No. 15/395,214, filed Dec. 30, 2016, entitled: "V" SHAPED AND WIDE PLATOON FORMATIONS.

This application is related to U.S. application Ser. No. 15/395,160, filed Dec. 30, 2016, entitled: VARYING THE DISTANCE BETWEEN VEHICLES IN A PLATOON; U.S. application Ser. No. 15/395,219, filed Dec. 30, 2016, entitled: SELF-ORDERING OF FLEET VEHICLES IN A PLATOON; and U.S. application Ser. No. 15/395,251, filed Dec. 30, 2016, entitled: DETECTION OF EXTRA-PLATOON VEHICLE INTERMEDIATE OR ADJACENT TO PLATOON MEMBER VEHICLES, the contents of each of these applications being incorporated herein by reference in their entirety.

BACKGROUND

It is known that two or more vehicles moving along a roadway can cooperate as a road train or a "platoon" for mutually providing to the vehicles within the platoon various safety and efficiency benefits. A typical vehicle platoon includes a leader vehicle and one or more follower vehicles arranged serially along a single roadway lane. Larger platoons can involve many follower vehicles for providing enhanced efficiency, but ensuring the safety of to both the platooned vehicles as well as of the other non-platooning vehicles on the roadway most usually dictate the short single lane platoon incarnation.

The aerodynamic geometry of the vehicles within a platoon is a significant factor used in determining an ordering of the vehicles. As a general rule, a physically smaller vehicle following a physically larger vehicle will provide a greater benefit. Since commercial box trucks and tractors towing box trailers are in general taller and wider than most flatbed tractor trailer combinations, a maximum aerodynamic benefit and resultant fuel savings is realized by ordering vehicles classified this way such that the commercial box truck and tractors towing box trailers take the leader position(s) in the platoon, while the flatbed tractor trailer rigs take the follower position(s) in the platoon.

In addition to the above, maintaining a small distance or spacing between platooned vehicles gives greater benefit in terms of reduced energy consumption. However, holding a tight distance or spacing between platooned vehicles requires that careful attention be paid to various functional or environmental and operational characteristics and capabilities of the vehicles and other external conditions including the overall size of the platoon, weather conditions, relative braking abilities between vehicle pairs, relative acceleration abilities, relative load or cargo size and weight including required stopping distance, and the like. Special attention must also be paid to characteristics of the roadway such as roadway incline, decline, and turn radii. These various parameters implicate directly or indirectly the inter-vehicle safety considerations as well as the overall safety of multiple vehicle platoons.

In the single lane platoon incarnation described above, the vehicles participating in a platoon typically mutually cooperate to maintain a relatively fixed and constant (even or the same) distance between adjacent vehicles by exchanging deceleration commands, acceleration commands, and other command and data signals between adjacent vehicles of the platoon. On flat roadways, the even distance maintained between the vehicles is often fixed and constant in accordance with control protocols using combinations of global positioning systems (GPS) data sharing, deceleration command signal exchanges, and safety and efficiency algorithms. On graded roadways, the relatively even distance maintained between the vehicles is often modified to improve or otherwise maintain or enhance the overall safety and efficiency of the platoon. For example, the even distance maintained between the vehicles can be decreased during conditions of the platoon traversing an incline wherein the tendency of the overall platoon is to decrease speed slightly. Conversely, the even distance maintained between the vehicle can be increased during conditions of the platoon traversing a decline wherein the tendency of the overall platoon is to increase speed slightly. In any case, the relative distance between the vehicles of the platoon preferably remains substantially even, constant or the same in accordance with platoon control mechanisms and protocols in place.

For maintaining the preferred relatively fixed and constant (even or the same) distance between adjacent vehicles, many commercial vehicles that participate in platoons are highly sophisticated and are also equipped with adaptive cruise control (ACC) systems used for maintaining a safe relative distance between a host vehicle and a forward vehicle, and collision mitigation (CM) systems for avoiding or lessening the severity of impacts between a host and a forward vehicle using various combinations of transmission, vehicle retarder, and foundation brake controls.

In addition to the above, vehicles participating in a platoon typically share their positions with other vehicles of the platoon by communicating their GPS coordinate data with other vehicles using vehicle-to-vehicle (V2V) communications ("V2V Unicast" communications), and/or vehicle-2-vehicles (V2x) communications ("V2V Multicast" communications), and/or any other suitable communications that might be available. One SAE standard is J2945 directed in general to Dedicated Short Range Communication (DSRC), and a work in process portion of that standard is J2945/6 is directed to performance requirements for cooperative adaptive cruise control and platooning. J2945/6 is intended to define the data exchange that will be necessary for coordinated platoon maneuvers, and that definition of the categories should start with differentiating between platooning and ACC, then determining message sets and performance to realize cooperative vehicles.

Currently, the technique for vehicles participating in a platoon to share their position with other vehicles of the platoon involves determining, by each vehicle, its own GPS coordinate data, broadcasting by each vehicle its own GPS coordinate data to all of the other vehicles of the platoon using over-the-air communications (such as the J2945/6 communications), and receiving the GPS position data from all of the other vehicles of the platoon. In this way, each vehicle of the platoon knows the position(s) of each other vehicle of the platoon. The GPS coordinate data is then used by each vehicle to, among other things, establish the relatively even distance coordinated between the vehicles as generally described above.

Platoons that operate on public roadways, however, sometimes encounter conditions that enable more complicated platooning formations. For example, many roadways have more than one (1) lane, and some roadways have six (6) of more lanes. It would be useful to exploit available lanes when the traffic of other non-platooning vehicles may permit.

The present embodiments provide for a new and improved platoon management control system and method for rearranging three or more vehicles cooperatively travelling seriatim as a platoon along an associated roadway into a platoon arrangement other than the linear or single file formation.

The present embodiments further provide for a new and improved multi roadway lane platoon management control system and method for controlling the three of more vehicles cooperatively travelling as a multi-lane platoon along an associated multi-lane roadway into a platoon arrangement other than the linear or single file formation.

In addition, the present embodiments further provide for new and improved larger platoon sizes thereby enabling more vehicles to participate in the larger multi-lane platoon.

SUMMARY OF THE EXAMPLE EMBODIMENTS

The embodiments permit three or more vehicles moving along a roadway to cooperate as a road train or a "platoon" without requiring the three or more vehicle to necessarily abide by a single lane arrangement and/or formation.

The embodiments further permit three or more vehicles moving along a roadway to cooperate as a multi-lane platoon along an associated multi-lane roadway.

In accordance with one aspect, a platoon management control system and method uses the GPS position of the lead vehicle representative of the position of the vehicle relative to the associated geographical area for rearranging the vehicles into the non-columnar formation.

In accordance with another aspect, a platoon management control system and method uses braking performance data representative of the braking capabilities of following vehicles to rearrange the vehicles into the non-columnar formation.

In accordance with a further aspect, a platoon management control system and method uses a combination of the GPS position of the lead vehicle representative of the position of the vehicle relative to the associated geographical area, and braking performance data representative of the braking capabilities of following vehicles to rearrange the vehicles into the non-columnar formation.

In accordance with yet a further aspect, a platoon management control system and method uses a GPS position of the lead vehicle representative of the a physical size of the travelled roadway such as the width of the roadway to rearrange the vehicles into the non-columnar formation.

In accordance with yet a still further aspect, a platoon management control system and method uses a combination of the GPS position of the lead vehicle representative of the a physical size of the travelled roadway such as the width of the roadway, and braking performance data representative of the braking capabilities of following vehicles to rearrange the vehicles into the non-columnar formation.

Other embodiments, features and advantages of the example embodiments will become apparent from the following description of the embodiments, taken together with the accompanying drawings, which illustrate, by way of example, the principles of the example embodiments.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF THE EXAMPLE EMBODIMENTS

In the following description of the present invention reference is made to the accompanying figures which form a part thereof, and in which is shown, by way of illustration, exemplary embodiments illustrating the principles of the present invention and how it is practiced. Other embodiments can be utilized to practice the present invention and structural and functional changes can be made thereto without departing from the scope of the present invention.

Figure 1:
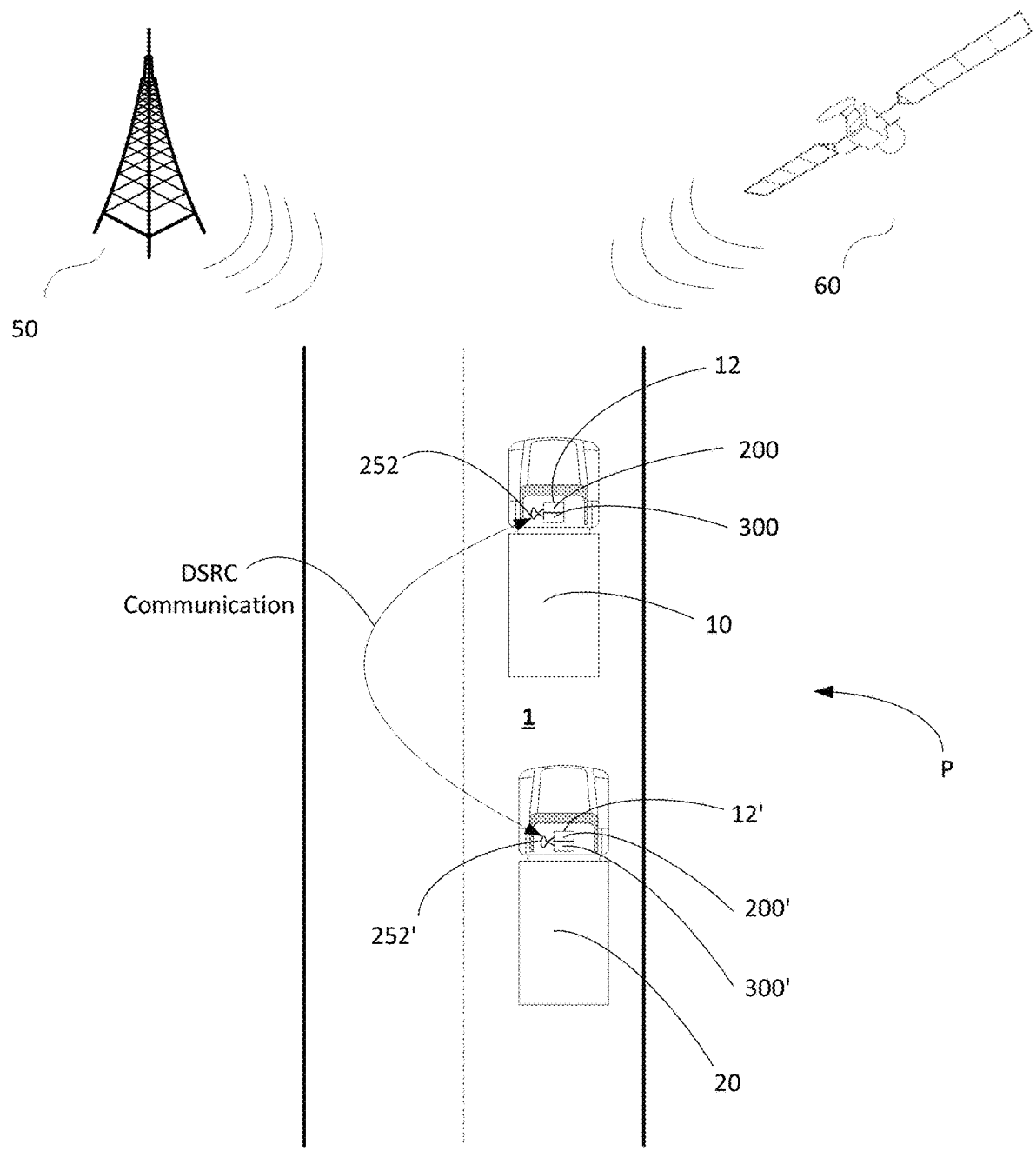
FIG. 1 is a schematic depiction of operation of an exemplary platoon in accordance with the embodiments.

Referring now to the drawings, wherein the showings are for the purpose of illustrating the example embodiments for rearrangement of vehicles onto non-columnar formations only, and not for purposes of limiting the same, FIG. 1 illustrates a basic platoon P including a host or leader vehicle 10 in traffic with a second or follower vehicle 20 in accordance with the present disclosure. As shown, the follower vehicle 20 is traveling proximate to the leader vehicle 10 seriatim in an ordered platoon P along a roadway 1. The leader vehicle 10 is provided with an electronic control system 12 which includes a data collection and communication module portion 200 and a platooning control portion 300 to be described in greater detail below. Similarly, the follower vehicle 20 is also provided with an electronic control system 12' which includes a data collection and communication module portion 200' and a platooning control portion 300'. In the example embodiments to be described herein, each of the two or more vehicles comprising the various platoons that will be described include the same or equivalent electronic control system 12, the same or equivalent data collection and communication module portion 200, and the same or equivalent platooning control portion 300, although other control systems having the functionality to be described herein may equivalently be used as necessary or desired.

In the example embodiment illustrated, the electronic control systems 12, 12' of the respective vehicles 10, 20 are configured for mutually communicating signals and exchanging data between each other, and also for communicating signals and exchanging data with various other communication systems including for example a remote wireless communication system 50 and a remote satellite system 60. These remote systems 50, 60 can provide, for example, global position system (GPS) data to the vehicles 10, 20 as desired. Other information may be provided or exchanged between the vehicles and the remote systems as well such as, for example, fleet management and control data from a remote fleet management facility, or the like (not shown). Although this functionality is provided, the embodiments herein find this remote communication, though useful, not necessarily essential wherein the embodiments herein are directed to inter-vehicle platoon distance and/or spacing management i.e. platoon ordering and spacing beneficially without the need to consult with or act under the direction of or in concert with the remote wireless communication system 50, the remote satellite system 60, the remote fleet management facility, a Network Operations Center (NOC), or the like.

In addition to the above, the electronic control systems 12, 12' of each vehicle 10, 20 operates to perform various vehicle-to-(single)vehicle (V2V Unicast) communication (communication between a broadcasting vehicle and a single responding vehicle), as well as various vehicle-to-(multiple) vehicle (V2V Broadcast) communication (communication between a broadcasting vehicle and two or more responding vehicles), and further as well as various vehicle-to-infrastructure (V2I) communication. Preferably, the local V2V Unicast and V2V Broadcast communication follows the J2945 DSRC communications specification. In this regard, the vehicles forming the basic platoon P can communicate with each other locally for self-ordering and spacing into a platoon without the need for input from the NOC in accordance with the embodiments herein. The vehicles forming the basic platoon P can also communicate with one or more other vehicles locally without the need for input from the NOC for negotiating the one or more other vehicles into the platoon in accordance with the embodiments herein. The vehicles forming the basic platoon P can further communicate with a fleet management facility remotely as may be necessary and/or desired for ordering into a platoon in accordance with further example embodiments herein.

As noted above, preferably, the local V2V Unicast and V2V Broadcast communication between vehicles as will be described herein follows the J2945 DSRC communications specification. This specification at present, does not define one-to-one vehicle communications. Rather, operationally, each communication-capable vehicle sends the needed information by a broadcast to every other communication-capable vehicle within range, and the receiving vehicle(s) decide if they want to process the received message. For example only vehicles who are platoon capable and the driver has indicated, via a switch or user interface, that joining a platoon is desired, that vehicle will start broadcasting and listening for the Platoon protocol messages. All other vehicles in the area will receive and ignore the platoon information. Accordingly, as will be used herein and for purposes of describing the example embodiments, "V2V Unicast" communication will refer to communication between a broadcasting vehicle and a single responding vehicle, and "V2V Broadcast communication" will refer to communication between a broadcasting vehicle and two or more responding vehicles. It is to be appreciated that "V2V Unicast" communication also refers to one-to-one direct vehicle communications as the J2945 DSRC communications specification is further developed or by use of any one or more other standards, specifications, or technologies now known or hereinafter developed.

Figure 2:
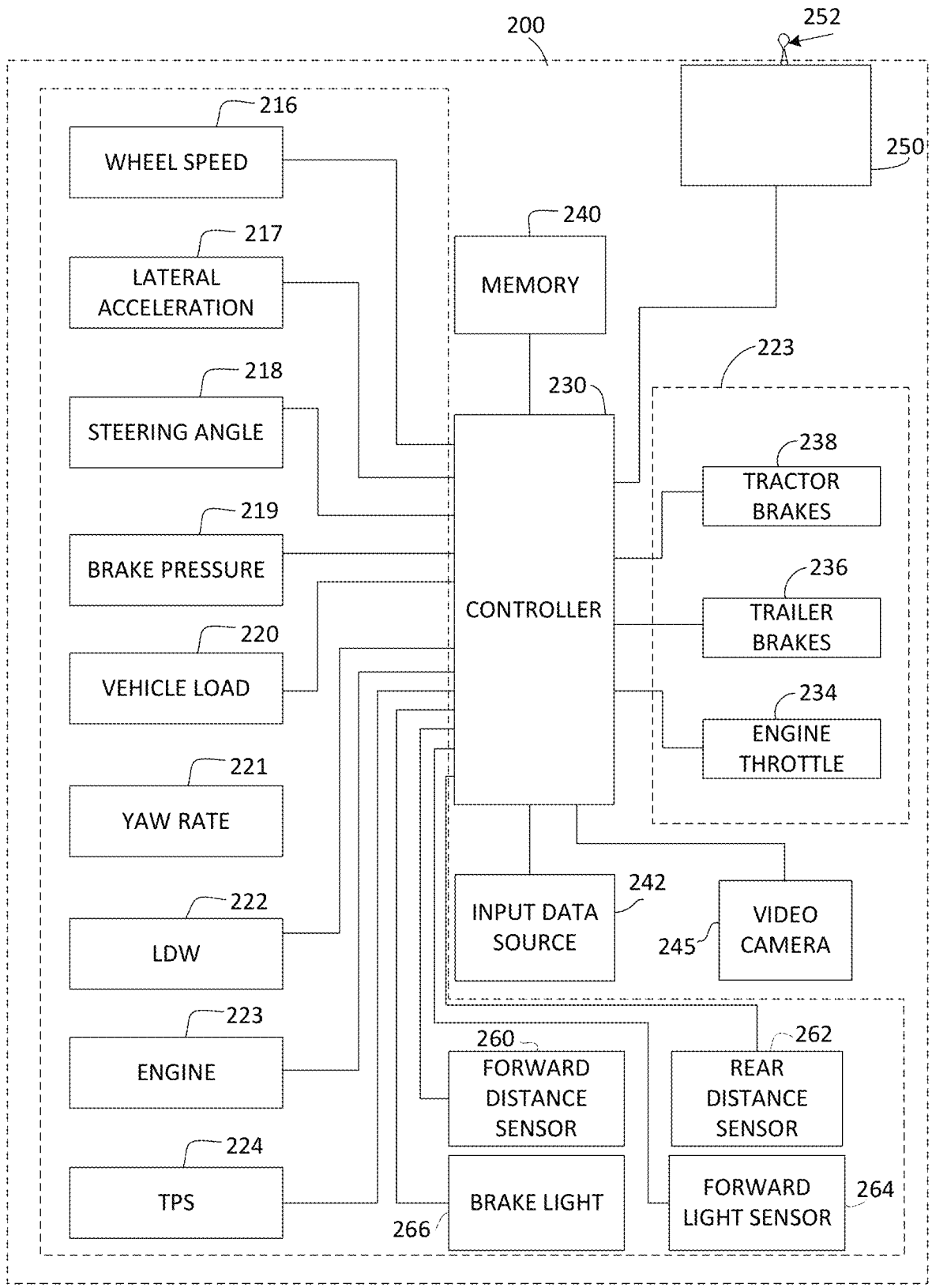
FIG. 2 is a schematic illustration of an exemplary embodiment of a data collection and communication module portion of the subject multi-lane platoon control system according to the example embodiment.

With reference next to FIG. 2, a schematic representation of a data collection and communication module portion 200 of the subject system for rearrangement of vehicles onto non-columnar V-shaped formations according to principles of the example embodiment is illustrated. The data collection and communication module 200 may be adapted to detect, monitor, and report a variety of operational parameters and conditions of the commercial vehicle and the driver's interaction therewith, and to selectively intervene and take corrective action as may be needed or desired such as, for example, to maintain vehicle stability or to maintain the vehicle following distance relative to other vehicles within a platoon. In the exemplary embodiment of FIG. 2, the data collection and communication module 200 may include one or more devices or systems 214 for providing input data indicative of one or more operating parameters or one or more conditions of a commercial vehicle. For example, the devices 214 may be one or more sensors, such as but not limited to, one or more wheel speed sensors 216, a lateral acceleration sensor 217, a steering angle sensor 218, a brake pressure sensor 619, a vehicle load sensor 220, a yaw rate sensor 221, a lane departure warning (LDW) sensor or system 222, one or more engine condition sensors 223, and a tire pressure (TPMS) monitoring system 224. The data collection and communication module 200 may also utilize additional devices or sensors in the exemplary embodiment including for example a forward distance sensor 260, a rear distance sensor 262, a rear light such as a rear brake light 266, and a forward light sensor. Other sensors and/or actuators or energy generation devices or combinations thereof may be used of otherwise provided as well, and one or more devices or sensors may be combined into a single unit as may be necessary and/or desired.

It is to be appreciated that in the example embodiment only a single forward distance sensor 260 is illustrated in the Figure to minimize the complexity of the drawing, and will be referred to herein as a single sensor for ease of discussion, even though the forward distance sensor 260 may comprise sets of plural sensors such as for example a set of a single forward-directed and a pair of lateral left- and right-directed distance sensors, or any other conformation of plural sensors for determining distances to the front, left, and right of the vehicle upon which they are mounted. It is to similarly be appreciated that in the example embodiment only a single rearward distance sensor 262 is illustrated in the Figure to minimize the complexity of the drawing, and will be referred to herein as a single sensor for ease of discussion, even though the rearward distance sensor 262 may comprise sets of plural sensors such as for example a set of a single rearward-directed and a pair of lateral left- and right-directed distance sensors, or any other conformation of plural sensors for determining distances to the rear, left, and right of the vehicle upon which they are mounted.

The data collection and communication module 200 may also include a logic applying arrangement 230, such as a controller or processor, in communication with the one or more devices or systems 214. The controller 230 may include one or more inputs for receiving input data from the devices or systems 214. The controller 230 may be adapted to process the input data and compare the raw or processed input data to a stored threshold value. The controller 230 may also include one or more outputs for delivering a control signal to one or more vehicle systems 232 based on the comparison. The control signal may instruct the systems 232 to intervene in the operation of the vehicle to initiate corrective action, and then report this corrective action to a wireless service (not shown) or simply store the data locally to be used for determining a driver quality. For example, the controller 230 may generate and send the control signal to an engine electronic control unit or an actuating device to reduce the engine throttle 234 and slowing the vehicle down. Further, the controller 230 may send the control signal to a vehicle brake system to selectively engage the brakes. In a tractor-trailer arrangement, the controller 230 may engage the brakes on one or more wheels of a trailer portion of the vehicle 236 and the brakes on one or more wheels of a tractor portion of the vehicle 238, and then report this corrective action to the wireless service or simply store the data locally to be used for determining a driver quality. A variety of corrective actions may be possible and multiple corrective actions may be initiated at the same time.

The controller 230 may also include a memory portion 240 for storing and accessing system information, such as for example the system control logic and control tuning. The memory portion 240, however, may be separate from the controller 230. The sensors 214 and controller 230 may be part of a preexisting system or use components of a preexisting system. For example, the Bendix® ABS-6™ Advanced Antilock Brake Controller with ESP® Stability System available from Bendix Commercial Vehicle Systems LLC may be installed on the vehicle. The Bendix ESP® system may utilize some or all of the sensors described in FIG. 2. The logic component of the Bendix® ESP® system resides on the vehicle's antilock brake system electronic control unit, which may be used for the controller 230 of the present invention. Therefore, many of the components to support the data collection and communication module 200 of the present invention may be present in a vehicle equipped with the Bendix® ESP® system, thus, not requiring the installation of additional components. The data collection and communication module 200, however, may utilize independently installed components if desired.

The data collection and communication module 200 may also include a source of input data 242 indicative of a configuration/condition of a commercial vehicle. The controller 230 may sense or estimate the configuration/condition of the vehicle based on the input data, and may select a control tuning mode or sensitivity based on the vehicle configuration/condition. The controller 230 may compare the operational data received from the sensors or systems 214 to the information provided by the tuning. The tuning of the system may include, but not be limited to: the nominal center of gravity height of the vehicle, look-up maps for lateral acceleration level for rollover intervention, look-up maps for yaw rate differential from expected yaw rate for yaw control interventions, steering wheel angle allowance, tire variation allowance, and brake pressure rates, magnitudes and maximums to be applied during corrective action.

A vehicle configuration/condition may refer to a set of characteristics of the vehicle which may influence the vehicle's stability (roll and/or yaw). For example, in a vehicle with a towed portion, the source of input data 242 may communicate the type of towed portion. In tractor-trailer arrangements, the type of trailer being towed by the tractor may influence the vehicle stability. This is evident, for example, when multiple trailer combinations (doubles and triples) are towed. Vehicles with multiple trailer combinations may exhibit an exaggerated response of the rearward units when maneuvering (i.e. rearward amplification). To compensate for rearward amplification, the data collection and communication module 200 may select a tuning that makes the system more sensitive (i.e. intervene earlier than would occur for a single trailer condition). The control tuning may be, for example, specifically defined to optimize the performance of the data collection and communication module for a particular type of trailer being hauled by a particular type of tractor. Thus, the control tuning may be different for the same tractor hauling a single trailer, a double trailer combination, or a triple trailer combination.

The type of load the commercial vehicle is carrying and the location of the center of gravity of the load may also influence vehicle stability. For example, moving loads such as liquid tankers with partially filled compartments and livestock may potentially affect the turning and rollover performance of the vehicle. Thus, a more sensitive control tuning mode may be selected to account for a moving load. Furthermore, a separate control tuning mode may be selectable when the vehicle is transferring a load whose center of gravity is particularly low or particularly high, such as for example with certain types of big machinery or low flat steel bars.

In addition, the controller 230 is operatively coupled with one or more video image capture devices shown in the example embodiment as a single video camera 645 representation of one or more physical video cameras disposed on the vehicle such as, for example, one video camera on each corner of the vehicle.

Still yet further, the data collection and communication module 210 may also include a transmitter/receiver (transceiver) module 250 such as, for example, a radio frequency (RF) transmitter including one or more antennas 252 for wireless communication of GPS data, one or more various vehicle configuration and/or condition data, or the like between the vehicles and one or more destinations such as, for example, to one or more wireless services 50, 60 (FIG.

1) having a corresponding receiver and antenna. The transmitter/receiver (transceiver) module 250 may include various functional parts of sub portions operatively coupled with the platoon control unit including for example a communication receiver portion, a global position sensor (GPS) receiver portion, and a communication transmitter. For communication of specific information and/or data, the communication receiver and transmitter portions may include one or more functional and/or operational communication interface portions as well.

The controller 230 is operative to communicate the acquired data to the one or more receivers in a raw data form, that is without processing the data, in a processed form such as in a compressed form, in an encrypted form or both as may be necessary or desired. In this regard, the controller 230 may combine selected ones of the vehicle parameter data values into processed data representative of higher level vehicle condition data such as, for example, data from the lateral acceleration sensor 218 may be combined with the data from the steering angle sensor 220 to determine excessive curve speed event data. Other hybrid event data relatable to the vehicle and driver of the vehicle and obtainable from combining one or more selected raw data items form the sensors includes, for example and without limitation, excessive braking event data, excessive curve speed event data, lane departure warning event data, excessive lane departure event data, lane change without turn signal event data, loss of video tracking event data, LDW system disabled event data, distance alert event data, forward collision warning event data, haptic warning event data, collision mitigation braking event data, ATC event data, ESC event data, RSC event data, ABS event data, TPMS event data, engine system event data, average following distance event data, average fuel consumption event data, and average ACC usage event data.

Figure 3:
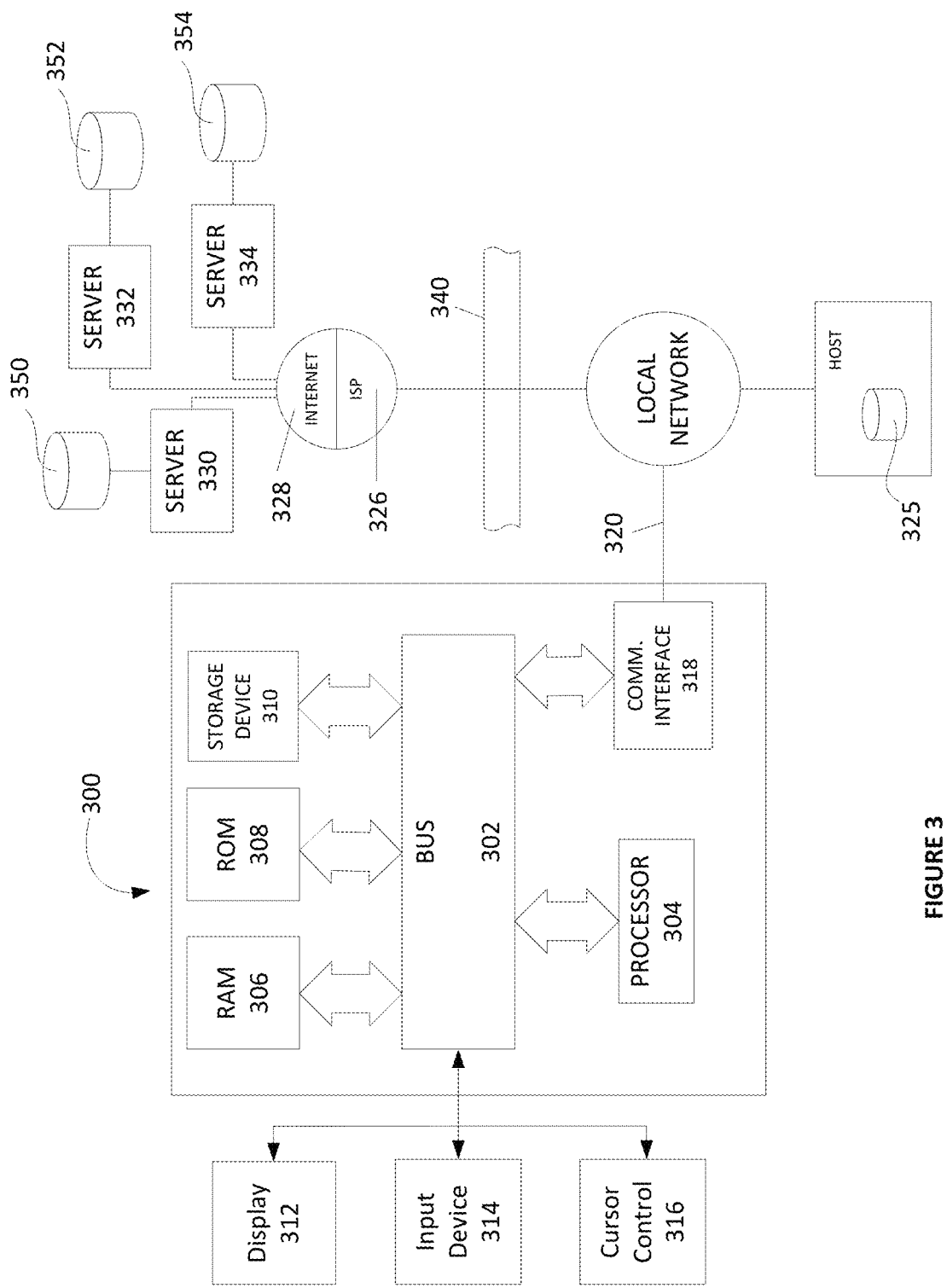
FIG. 3 is a block diagram that illustrates a multi-lane platoon control computer system suitable for executing embodiments of one or more software systems or modules that perform control management and methods of multi-lane platoon management and control according to the example embodiment.

FIG. 3 is a block diagram that illustrates a platoon rearrangement computer system 300 suitable for executing embodiments of one or more software systems or modules that perform fleet management and control according to the subject application. The example system includes a bus 302 or other communication mechanism for communicating information, and a processor 304 coupled with the bus for processing information. The computer system includes a main memory, such as random access memory (RAM) 306 or other dynamic storage device for storing information and instructions to be executed by the processor 304, and read only memory (ROM) 308 or other static storage device for storing static information and instructions for the processor 304. A storage device 310 is also suitably provided for storing information and instructions.

The example embodiments described herein are related to the use of the computer system 300 for accessing, aggregating, manipulating and displaying information from multiple remote resources such as, for example, indirectly from multiple fleet vehicles 10, 20 and directly from multiple wireless services 50, 60. Further, the embodiments described herein are related to the use of computer system 300 for accessing information from the multiple sources in selective combination with internal proprietary data such as driver sensitive data, sales, costs, expense records, travel data, and the like from within a firewall 340. According to one implementation, information from the multiple remote public, commercial, and/or internal proprietary resources is provided by computer system 300 in response to the processor 304 executing one or more sequences of one or more instructions contained in main memory 306. Such instructions may be read into main memory 306 from another computer-readable medium, such as storage device 310. Execution of the sequences of instructions contained in main memory 306 causes the processor 304 to perform the process steps described herein. In an alternative implementation, hard-wired circuitry may be used in place of or in combination with software instructions to implement the invention. Thus implementations of the example embodiments are not limited to any specific combination of hardware circuitry and software.

In accordance with the descriptions herein, the term "computer-readable medium" as used herein refers to any non-transitory media that participates in providing instructions to the processor 304 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, or any other tangible non-transitory medium from which a computer can read.

In addition and further in accordance with the descriptions herein, the term "logic", as used herein with respect to the Figures, includes hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components.

The platoon rearrangement computer system 300 includes a communication interface 318 coupled to the bus 302 which provides a two-way data communication coupling to a network link 320 that is connected to local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 supporting a database 325 storing internal proprietary data and/or to data equipment operated by an Internet Service Provider (ISP) 326. ISP 326 in turn provides data communication services through the Internet 328. Local network 322 and Internet 328 both use electric, electromagnetic or optical signals that carry digital data streams. The signals through the various networks and the signals on network link 320 and through communication interface 318, which carry the digital data to and from the platoon self-ordering computer system 300, are exemplary forms of carrier waves transporting the information.

The platoon rearrangement computer system 300 can send messages and receive data, including program code, through the network(s), network link 320 and communication interface 318. In the Internet-connected example embodiment, the platoon rearrangement computer system 300 is operatively connected with a plurality of external public, private, governmental or commercial servers (not shown) as one or more wireless services 50, 60 configured to execute a web application in accordance with the example embodiment to be described below in greater detail. In the example embodiment shown, the first server 330 is coupled with a database 350 storing selected data received by a first wireless service such as for example data from a first telematics supplier, the second first server 332 is coupled with a database 352 storing selected data received by a second wireless service such as for example data from a second telematics supplier, and the third server 334 is coupled with a database 354 storing selected proprietary data and executable code for performing the web application. The platoon rearrangement computer system 300 is operative to selectively transmit a request for data to be selectively retrieved from the respective databases 350, 352, 354 through Internet 328, ISP 326, local network 322 and communication interface 318 or to receive selected data pushed from the databases 350, 352, 354, or by both means in accordance with the example embodiments. The received data is processed executed by the processor 304 as it is received, and/or stored in storage device 310, or other non-volatile storage for later processing or data manipulation.

Although platoon rearrangement computer system 300 is shown in FIG. 3 as being connectable to a set of three (3) servers, 330, 332, and 334, those skilled in the art will recognize that platoon rearrangement computer system 300 may establish connections to multiple additional servers on Internet 328. Each such server in the example embodiments includes HTTP-based Internet applications, which may provide information to platoon rearrangement computer system 300 upon request in a manner consistent with the present embodiments.

Selectively locating the proprietary commercial data in database 325 within the firewall 340 is advantageous for numerous reasons including enabling rapid comprehensive local queries without substantial network overhead. However, it is important to maintain the accuracy of the data by performing update or refresh operations on a schedule based on the characteristics of the desired data or on the data requirements of a particular query.

The platoon rearrangement computer system 300 suitably includes several subsystems or modules to perform the platoon rearrangement control and management as set forth herein. A primary purpose of the subject application is to provide an improved intuitive and convenient user interface which allows a user to select parameters for performing platoon rearrangement management and control, and to make adjustments of the parameters based on the result presentation as necessary or desired.

Figure 4A:
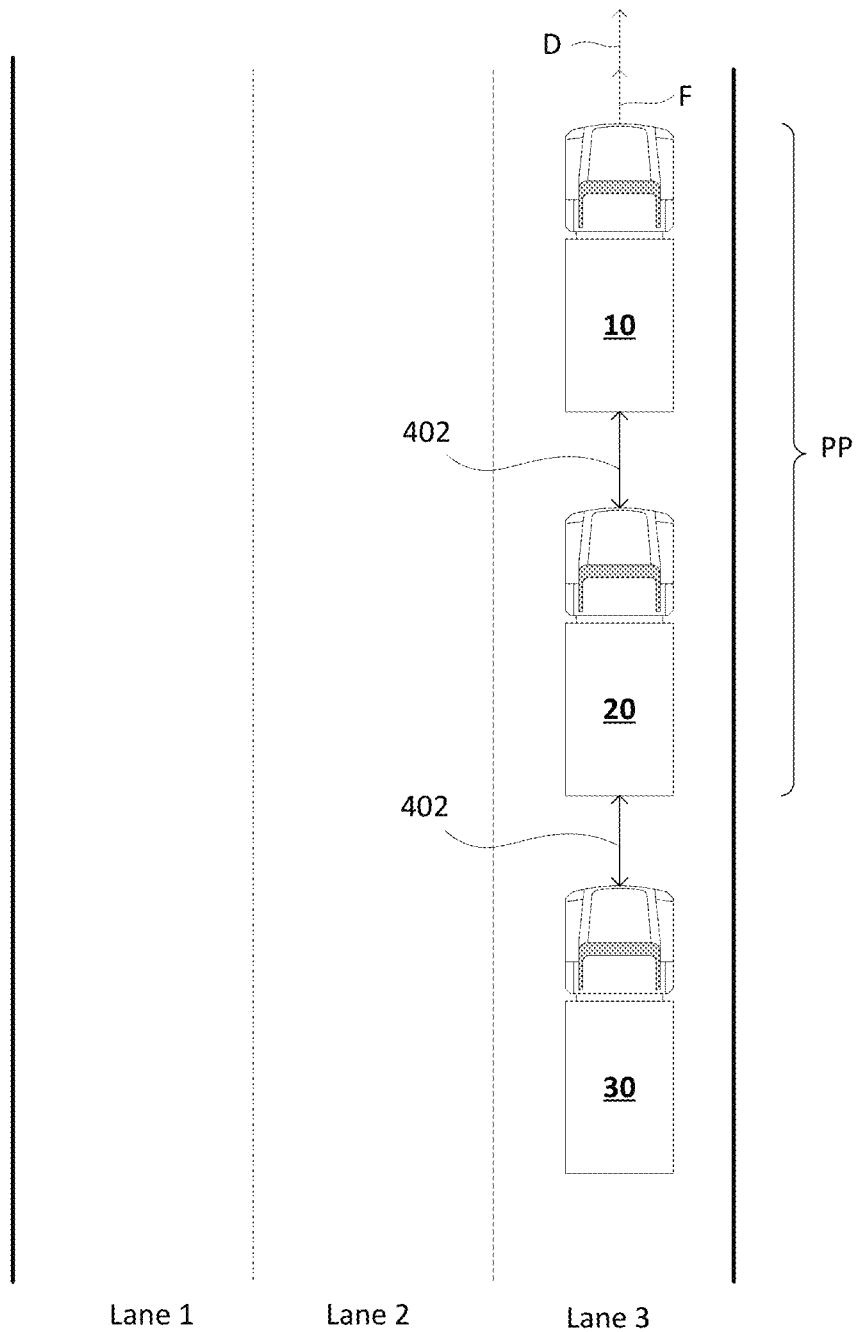
FIGS. 4a-4c are a schematic depiction illustrating a sequential rearrangement of a platoon from a standard linear column-type platoon arrangement into a first non-linear, non-columnar V-shaped platoon arrangement in accordance with an example embodiment.
Figure 4B:
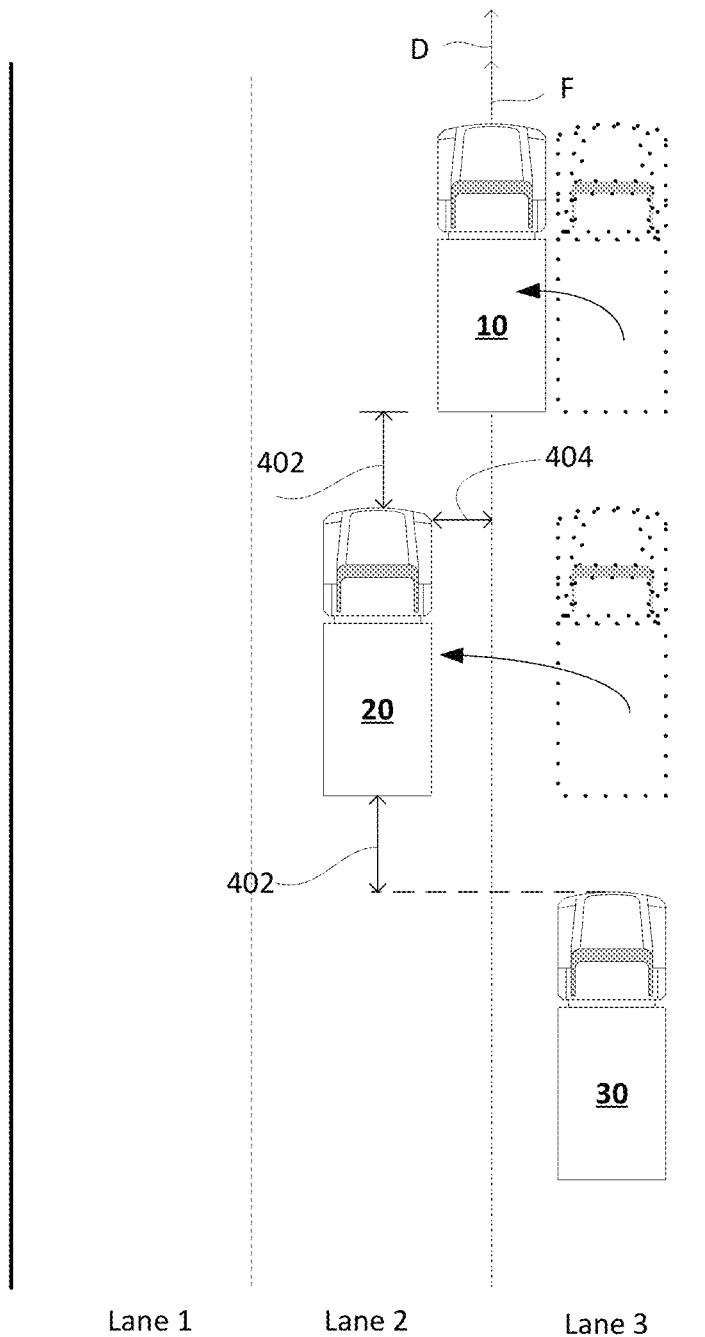
Figure 4C:
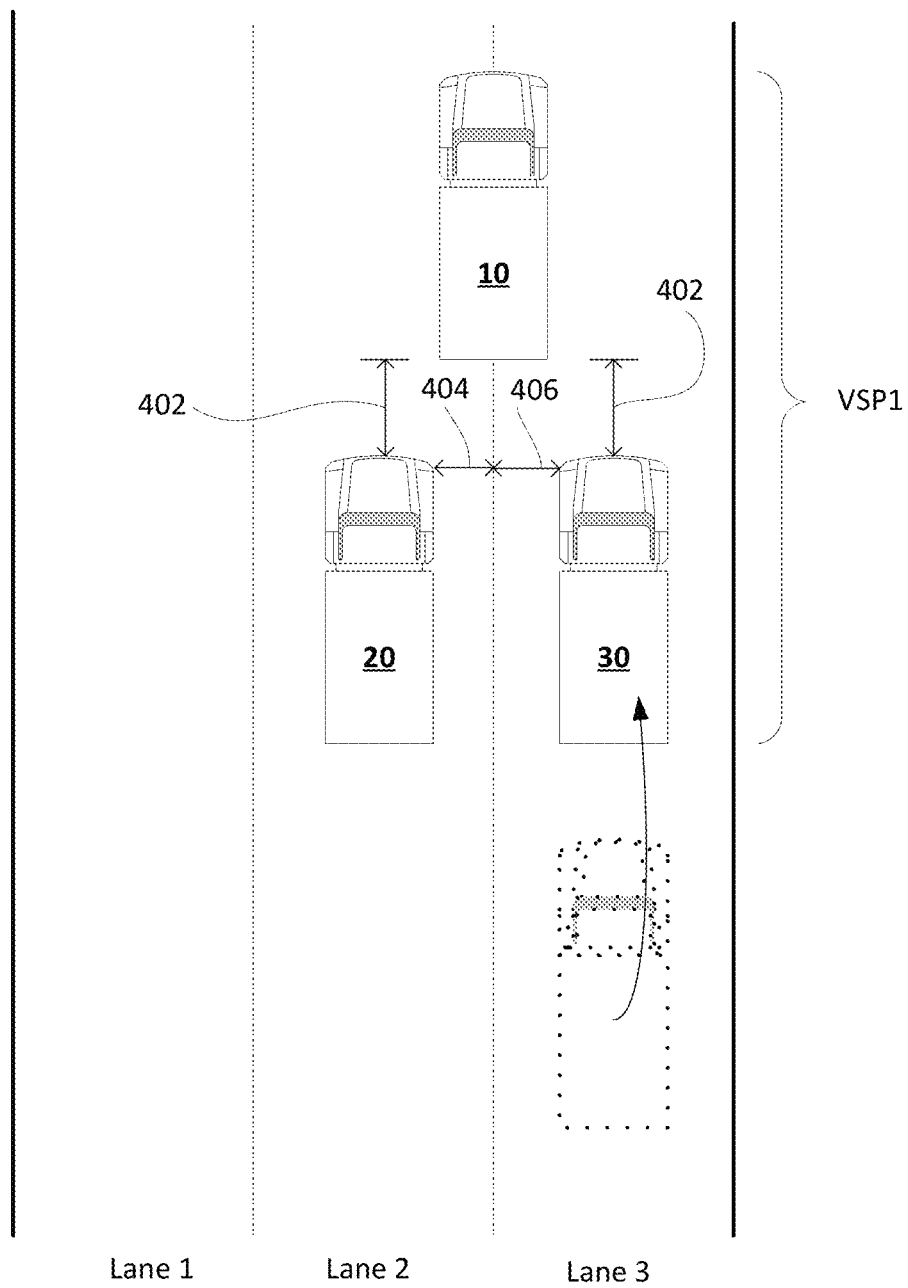

FIGS. 4a-4c are a schematic depiction illustrating a sequential rearrangement of a platoon from a standard linear column-type platoon PP arrangement as shown in FIG. 4a into a first non-linear, non-columnar V-shaped platoon VSP1 arrangement as shown in FIG. 4c in accordance with an example embodiment. In FIG. 4a the second and third vehicles 20, 30 follow behind the leader vehicle 10 travelling in a lane Lane3 on an associated roadway 10 along a forward path F in a first forward direction D by a following or longitudinal gap distance 402. The following or longitudinal gap distance 402 is parallel to the first forward direction D and the path of travel F of the leading vehicle. The vehicle 20 FIG. 4a illustrates a basic platooning vehicle pair PP including a host or leader vehicle 10 in traffic with second or follower vehicles 20, 30 in accordance with the present disclosure. As shown, the follower vehicles 20, 30 are traveling proximate to the leader vehicle 10 seriatim in an ordered platoon pair PP along a roadway 1. The leader vehicle 10 is provided with an electronic control system of the type described above which includes a data collection and communication module portion of the type described above and a platooning control portion also of the type described above. Similarly, the follower vehicles 20, 30 are each also provided with an electronic control system which includes a data collection and communication module portion 200' and a platooning control portion 300'. In the example embodiments to be described herein, each of the two or more vehicles comprising the various platoons that will be described include the same or equivalent electronic control system 5, the same or equivalent data collection and communication module portion 200, and the same or equivalent platooning control portion 300, although other control systems having the functionality to be described herein may equivalently be used as necessary or desired.

In FIG. 4b the second and third vehicles 20, 30 follow behind the leader vehicle 10 travelling in a lane Lane3 on an associated roadway 10 along a forward path F in a first forward direction D by both a following or longitudinal gap distance 402 as well as a lateral offset distance 404. The following or longitudinal gap distance 402 is parallel to the first forward direction D and the path of travel F of the leading vehicle. The lateral offset distance 404 is parallel to the first forward direction D and the path of travel F of the leading vehicle. The leading vehicle 10 has shifted to the left as viewed in the Figure to span the right lane pair Lane2, Lane3 of the roadway. Also the following vehicle 20 has shifted to the left as viewed in the Figure to be centered in the middle lane Lane2 of the roadway. The other following vehicle 30 remains in FIG. 4b centered in the rightmost lane Lane3.

FIG. 4c shown the completed reorganization from the columnar basic platoon PP of FIG. 4a into a first V-shaped non-linear and non-columnar platoon VSP1 in accordance with an example embodiment. The vehicle 20 FIG. 4a illustrates a basic platooning vehicle pair PP including a host or leader vehicle 10 in traffic with second or follower vehicles 20, 30 in accordance with the present disclosure. In FIG. 4c the second and third vehicles 20, 30 follow behind the leader vehicle 10 travelling spanning lanes Lane2, Lane3 on the associated roadway 10 along the forward path F in the first forward direction D by both a following or longitudinal gap distance 402 as well as a lateral offset distances 404, 406. The following or longitudinal gap distance 402 is parallel to the first forward direction D and the path of travel F of the leading vehicle. The lateral offset distances 404, 406 are parallel to the first forward direction D and the path of travel F of the leading vehicle. In the example embodiment, the lateral offset distances 404, 406 parallel to the first forward direction D and the path of travel F of the leading vehicle are the same thereby making the resultant V-shaped platoon VSP1 symmetrical about the forward path F of the leading vehicle 10. The leading vehicle 10 has shifted to the left as viewed in the Figure to span the right lane pair Lane2, Lane3 of the roadway. Also the following vehicle 20 has shifted to the left as viewed in the Figure to be centered in the middle lane Lane2 of the roadway. The other following vehicle 30 remains in FIG. 4c centered in the rightmost lane Lane3.

In the example embodiment illustrated and as described above, the electronic control systems of the respective vehicles 10, 20 are configured for mutually communicating signals and exchanging data between each other, and also for communicating signals and exchanging data with various other communication systems including for example a remote wireless communication system 50 and a remote satellite system 60. These remote systems 50, 60 can provide, for example, global position system (GPS) data to the vehicles 10, 20, 30 as desired. Other information may be provided or exchanged between the vehicles and the remote systems as well such as, for example, fleet management and control data from a remote fleet management facility, or the like (not shown). Although this functionality is provided, the embodiments herein find this remote communication, though useful, not necessarily essential wherein the embodiments herein are directed to inter-vehicle platoon distance and/or spacing management i.e. platoon ordering and spacing beneficially without the need to consult with or act under the direction of or in concert with the remote wireless communication system 50, the remote satellite system 60, the remote fleet management facility, a Network Operations Center (NOC), or the like.

In addition to the above, the electronic control systems of each vehicle 10, 20, 30 operates to perform various vehicle-to-(single)vehicle (V2V Unicast) communication (communication between a broadcasting vehicle and a single responding vehicle), as well as various vehicle-to-(multiple) vehicle (V2V Broadcast) communication (communication between a broadcasting vehicle and two or more responding vehicles), and further as well as various vehicle-to-infrastructure (V2I) communication. Preferably, the local V2V Unicast and V2V Broadcast communication follows the J2945 DSRC communications specification. In this regard, the vehicles forming the basic platoon PP can communicate with each other locally for self-ordering and spacing into a platoon without the need for input from the NOC in accordance with the embodiments herein. The vehicles forming the basic platoon P can also communicate with one or more other vehicles locally without the need for input from the NOC for negotiating the one or more other vehicles into the platoon in accordance with the embodiments herein. The vehicles forming the V-shaped platoon VSP1 can further communicate with a fleet management facility remotely as may be necessary and/or desired for ordering into a platoon in accordance with further example embodiments herein.

As noted above, preferably, the local V2V Unicast and V2V Broadcast communication between vehicles as will be described herein follows the J2945 DSRC communications specification. This specification at present, does not define one-to-one vehicle communications. Rather, operationally, each communication-capable vehicle sends the needed information by a broadcast to every other communication-capable vehicle within range, and the receiving vehicle(s) decide if they want to process the received message. For example only vehicles who are platoon capable and the driver has indicated, via a switch or user interface, that joining a platoon is desired, that vehicle will start broadcasting and listening for the platoon protocol messages. All other vehicles in the area will receive and ignore the platoon information. Accordingly, as will be used herein and for purposes of describing the example embodiments, "V2V Unicast" communication will refer to communication between a broadcasting vehicle and a single responding vehicle, and "V2V Broadcast communication" will refer to communication between a broadcasting vehicle and two or more responding vehicles. It is to be appreciated that "V2V Unicast" communication also refers to one-to-one direct vehicle communications as the J2945 DSRC communications specification is further developed or by use of any one or more other standards, specifications, or technologies now known or hereinafter developed.

In accordance with an embodiment, a system 12, 12' is provided for controlling reorganization of the platooning vehicles from the linear column platoon PP to a non-linear platoon VSP1. In the example embodiment, the system 12, 12' is operable in associated platooning vehicles comprising an associated leading vehicle 10 and a plurality of associated following vehicles 20, 30 cooperatively travelling seriatim as a linear column platoon PP in an associated geographical area on an associated roadway in a first direction D along a forward path F for controlling reorganization of the platooning vehicles from the linear column platoon PP to a non-linear platoon VSP1. The system 12, 12' includes a platoon control unit 300, 300' configured to be disposed in the associated leading vehicle 10. The platoon control unit includes a processor 304, a non-transient memory device 308, 310 operatively coupled with the processor, and 308, 310 logic stored in the non-transient memory and executable by the processor to selectively reorganize the platooning vehicles. The system 12, 12' further includes a communication receiver 252 operatively coupled with the platoon control unit a global position sensor (GPS) receiver 252 operatively coupled with the platoon control unit a communication transmitter 252 operatively coupled with the platoon control unit The communication receiver is operable to receive performance capability signals (Perform_Sig) from the plurality of associated following vehicles (20, 30, 40, 50, 60, . . . ). The performance capability signals (Perform_Sig) comprise performance data (Perform_Data) representative of one or more performance characteristics of the plurality of associated following vehicles (20, 30, 40, 50, 60, . . . ).

The global position sensor (GPS) receiver is operable to receive a global position signal (GPS_Sig) from an associated source 50, 60 of global position information. The global position signal comprises global position data (GPS_Data) representative of a position of the associated leading vehicle (10) relative to the associated geographical area.

The communication transmitter comprises a first communication interface responsive to a reorganization initiate signal (Reorg) to selectively transmit, to a first set (R1) of first and second following vehicles (20, 30) of the plurality of following vehicles (20, 30, 40, 50, 60, . . . ) a first lateral offset distance signal ($1^{st}\_Lat\_Off\_Sig$), and a first longitudinal gap distance signal ($1^{st}\_Long\_Off\_Sig$). The first lateral offset distance signal ($1^{st}\_Lat\_Off\_Sig$) comprises first lateral offset distance data (404, 406 $1^{st}\_Lat\_Off$) representative of first lateral offset distances ($1^{st}\_Offsets$) in a direction perpendicular to the forward path (F) and offset from the forward path (F) to be maintained in the non-linear platoon (VSP1) by each of the first and second vehicles (20, 30) of the first set (R1) relative to the forward path (F).

The first longitudinal gap distance signal ($1^{st}\_Long\_Off\_Sig$) comprises first longitudinal gap distance data (404, $1^{st}\_Long\_Off$) representative of first longitudinal gap distances ($1^{st}\_Gaps$) in a direction along the first direction (D) to be maintained in the non-linear platoon (VSP1) by the each of the first and second vehicles (20, 30) of the first set (R1) relative to the leader vehicle (10).

The logic of the platoon control unit is executable by the processor to generate the first lateral offset distance data (404, 406 $1^{st}\_Lat\_Off$) and the first longitudinal gap distance data (402, $1^{st}\_Long\_Off$) in accordance with a predetermined combination of the global position data (GPS_Data) representative of the position of the associated leading vehicle (10) relative to the associated geographical area, the performance data (Perform_Data) representative of the one or more performance characteristics of the plurality of associated following vehicles (20, 30, 40, 50, 60, . . . ), and the reorganization initiate signal (Reorg).

In accordance with the example embodiments, the communication receiver is operable to receive, as the performance capability signals (Perform_Sig), braking performance capability signals (BRK_Perform_Sig) from the plurality of associated following vehicles (20, 30, 40, 50, 60, . . . ). The braking performance capability signals (BRK_Perform_Sig) comprise braking performance data (BRK_Perform_Data) representative of braking capabilities of the plurality of associated following vehicles (20, 30, 40, 50, 60, . . . ). In addition, the logic of the platoon control unit is executable by the processor to generate the first lateral offset distance data (404, 406, $1^{st}\_Lat\_Off$) and the first longitudinal gap distance data (402, $1^{st}\_Long\_Off$) in accordance with a predetermined combination of the global position data (GPS_Data) representative of the position of the associated leading vehicle (10) relative to the associated geographical area and the braking performance data (BRK_Perform_Data) representative of the braking capabilities of the plurality of associated following vehicles (20, 30, 40, 50, 60, . . . ).

Further in accordance with the example embodiments, the first communication interface is operable to transmit, to the first set (R1) of first and second following vehicles (20, 30) the first lateral offset distance data ($1^{st}\_Lat\_Off$) and the first longitudinal gap distance data ($1^{st}\_Long\_Off$). The first lateral offset distance data ($1^{st}\_Lat\_Off$) is representative of a single lateral offset distance ($1^{st}\_Offset$) in a direction perpendicular to the forward path (F) and offset on opposite sides of the forward path (F) to be maintained in the non-linear platoon (VSP1) by each of the first and second vehicles (20, 30) of the first set (R1) relative to the forward path (F). Preferably, the first lateral offset distance data ($1^{st}\_Lat\_Off$) is selectively usable by the following vehicles 20, 30 for effecting the V-shaped platoon VSP1 formation.

The first longitudinal gap distance data ($1^{st}\_Long\_Off$) is representative of a single longitudinal gap distance ($1^{st}\_Gap$) in a direction along the forward direction (D) to be maintained in the non-linear platoon (VSP1) by the each of the first and second vehicles (20, 30) of the first set (R1) relative to the leader vehicle (10). Preferably, the first longitudinal gap distance data ($1^{st}\_Long\_Off$) is selectively usable by the following vehicles 20, 30 for effecting the V-shaped platoon VSP1 formation.

As noted above, it is to be appreciated that in the example embodiment only a single forward distance sensor 260 is illustrated in the Figure to minimize the complexity of the drawing, and will be referred to herein as a single sensor for ease of discussion, even though the forward distance sensor 260 may comprise sets of plural sensors such as for example a set of a single forward-directed and a pair of lateral left- and right-directed distance sensors, or any other conformation of plural sensors for determining distances to the front, left, and right of the vehicle upon which they are mounted. It is to similarly be appreciated that in the example embodiment only a single rearward distance sensor 262 is illustrated in the Figure to minimize the complexity of the drawing, and will be referred to herein as a single sensor for ease of discussion, even though the rearward distance sensor 262 may comprise sets of plural sensors such as for example a set of a single rearward-directed and a pair of lateral left- and right-directed distance sensors, or any other conformation of plural sensors for determining distances to the rear, left, and right of the vehicle upon which they are mounted. In this regard, the forward and rearward distance sensors 260, 262 are used as may be necessary and/or desired selectively in combination with the first lateral and longitudinal offset distance data ($1^{st}\_Lat\_Off$, $1^{st}\_Long\_Off$) for effecting the V-shaped platoon VSP1 formation as shown in FIG. 4c. The forward and rearward distance sensors 260, 262 may be selectively used to maintain the first longitudinal gap distance and the first lateral distance between the vehicles for effecting the V-shaped platoon VSP1 formation.

Figure 5A:
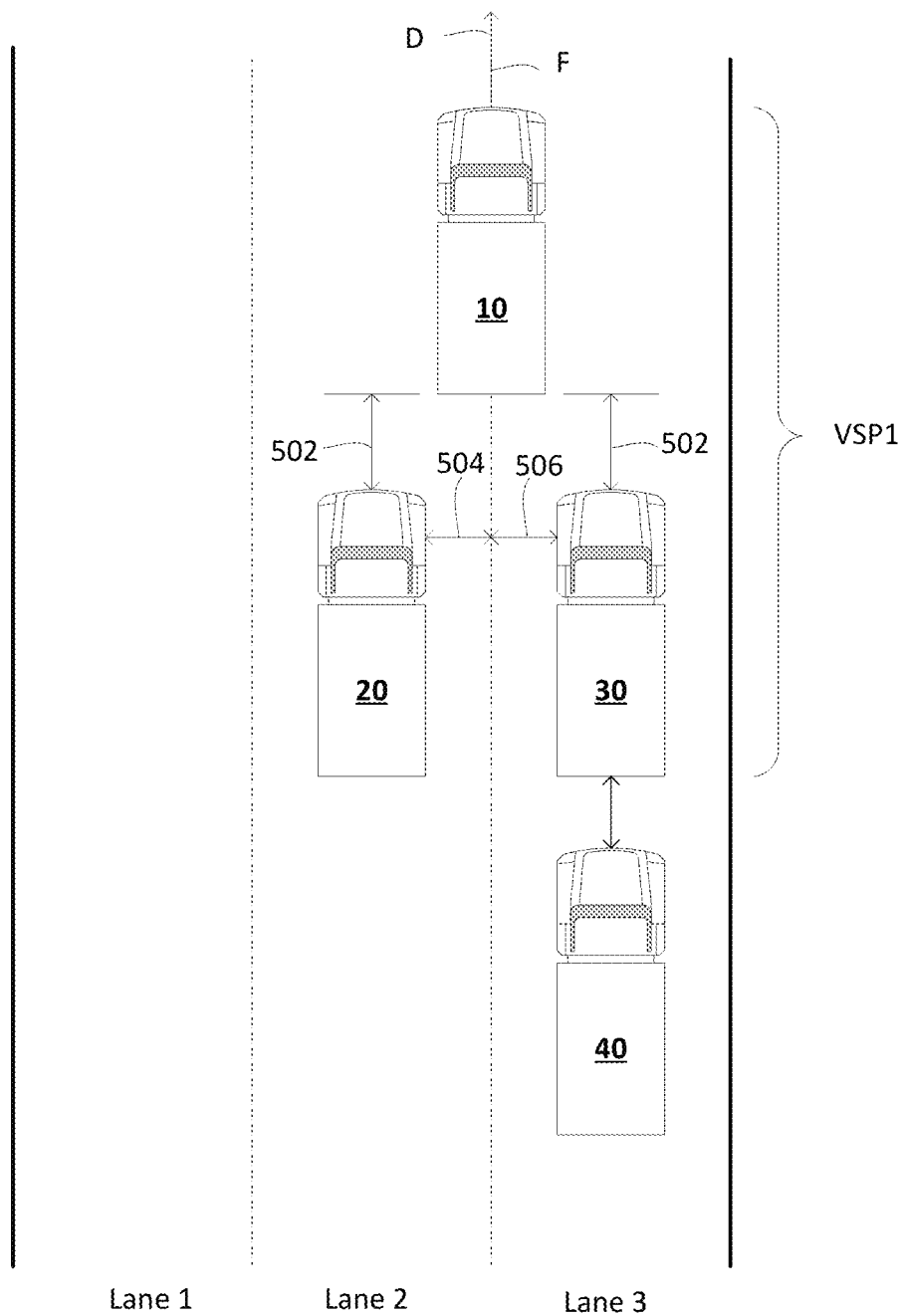
FIGS. 5a and 5b are a schematic depiction illustrating a sequential rearrangement of a platoon from the first non-linear, non-columnar V-shaped platoon arrangement VSP1 of FIG. 4c into a second non-linear, non-columnar V-shaped platoon arrangement VSP2 in accordance with an example embodiment.
Figure 5B:
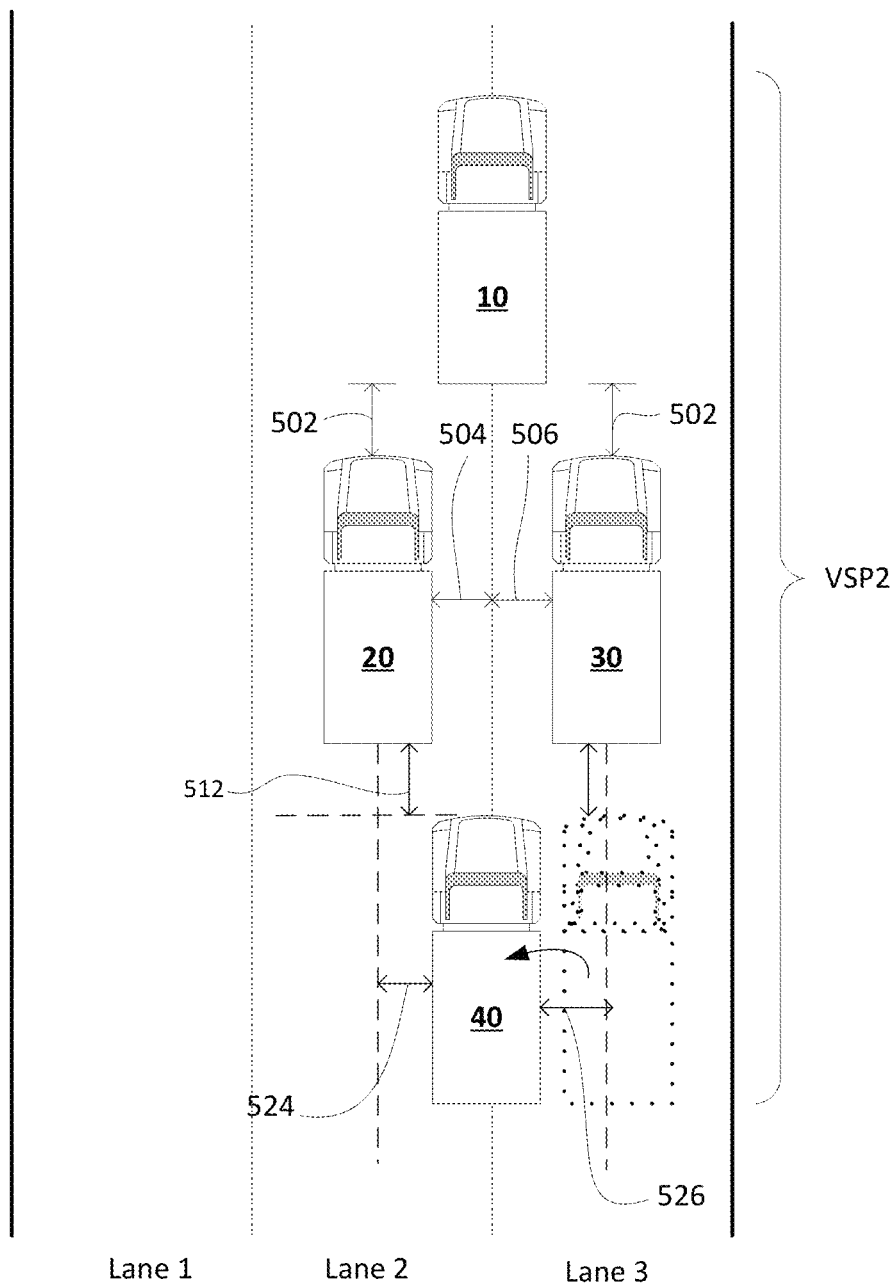

FIGS. 5a and 5b are a schematic depiction illustrating a sequential rearrangement of a platoon from the first non-linear, non-columnar V-shaped platoon arrangement VSP1 of FIG. 4c into a second non-linear, non-columnar V-shaped platoon arrangement VSP2 in accordance with an example embodiment. In FIG. 5a the second and third vehicles 20, 30 follow behind the leader vehicle 10 travelling spanning lanes Lane2, Lane3 on an associated roadway 10 along a forward path F in a first forward direction D by a following or longitudinal gap distance 502. The following or longitudinal gap distance 502 is parallel to the first forward direction D and the path of travel F of the leading vehicle. The leader vehicle 10 is provided with an electronic control system of the type described above which includes a data collection and communication module portion of the type described above and a platooning control portion also of the type described above. Similarly, the follower vehicles 20, 30, 40 are each also provided with an electronic control system which includes a data collection and communication module portion 200' and a platooning control portion 300'. In the example embodiments to be described herein, each of the two or more vehicles comprising the various platoons that will be described include the same or equivalent electronic control system 5, the same or equivalent data collection and communication module portion 200, and the same or equivalent platooning control portion 300, although other control systems having the functionality to be described herein may equivalently be used as necessary or desired.

In FIG. 5b the second and third vehicles 20, 30 follow behind the leader vehicle 10 travelling spanning lanes Lane2, Lane3 on an associated roadway 10 along a forward path F in a first forward direction D by both a following or longitudinal gap distance 502 as well as a lateral offset distances 504, 506. The following or longitudinal gap distance 502 is parallel to the first forward direction D and the path of travel F of the leading vehicle. The lateral offset distances 504, 506 are parallel to the first forward direction D and the path of travel F of the leading vehicle. The leading vehicle 10 has shifted to the left as viewed in the Figure to span the right lane pair Lane2, Lane3 of the roadway. Also the following vehicle 20 has shifted to the left as viewed in the Figure to be centered in the middle lane Lane2 of the roadway. The other following vehicle 30 remains in FIG. 5b centered in the rightmost lane Lane3. A fourth following vehicle 40

FIG. 5b shows the completed reorganization from the platoon VSP1 of FIG. 4c into a second V-shaped non-linear and non-columnar platoon VSP2 in accordance with an example embodiment. In FIG. 5b the second and third vehicles 20, 30 follow behind the leader vehicle 10 travelling spanning lanes Lane2, Lane3 on the associated roadway 10 along the forward path F in the first forward direction D by both a following or longitudinal gap distance 502 as well as a lateral offset distances 504, 506. The following or longitudinal gap distance 502 is parallel to the first forward direction D and the path of travel F of the leading vehicle. The lateral offset distances 504, 506 are parallel to the first forward direction D and the path of travel F of the leading vehicle. In the example embodiment, the lateral offset distances 504, 506 perpendicular to the first forward direction D and the path of travel F of the leading vehicle are the same thereby making the resultant V-shaped platoon VSP1 symmetrical about the forward path F of the leading vehicle 10. The leading vehicle 10 has shifted to the left as viewed in the Figure to span the right lane pair Lane2, Lane3 of the roadway. Also the following vehicle 20 has shifted to the left as viewed in the Figure to be centered in the middle lane Lane2 of the roadway. The following vehicle 30 remains in FIG. 4c centered in the rightmost lane Lane3.

A further following vehicle 40 has also shifted to the left as viewed in the Figure to follow the other following vehicles in a third row and travelling spanning lanes Lane2, Lane3 on the associated roadway 10 along the forward path F in the first forward direction D. The further following vehicle 40 follows the vehicles 20, 30 of the second row by both a following or longitudinal gap distance 512 as well as a lateral offset distances 524, 526. The following or longitudinal gap distance 512 is parallel to the first forward direction D and the path of travel F of the leading vehicle. The lateral offset distances 524, 526 are parallel to the first forward direction D and the path of travel F of the leading vehicle. In the example embodiment, the lateral offset distances 524, 526 perpendicular to the first forward direction D and the path of travel F of the leading vehicle are the same thereby making the resultant V-shaped platoon VSP2 symmetrical about the forward path F of the leading vehicle 10.

The forward and rearward distance sensors 260, 262 are used as may be necessary and/or desired selectively in combination with the lateral and longitudinal offset distance data for effecting the V-shaped platoon VSP2 formation as shown in FIG. 5b. The forward and rearward distance sensors 260, 262 may be selectively used to maintain the first longitudinal gap distance and the first lateral distance between the vehicles for effecting the V-shaped platoon VSP2 formation.

Figure 6A:
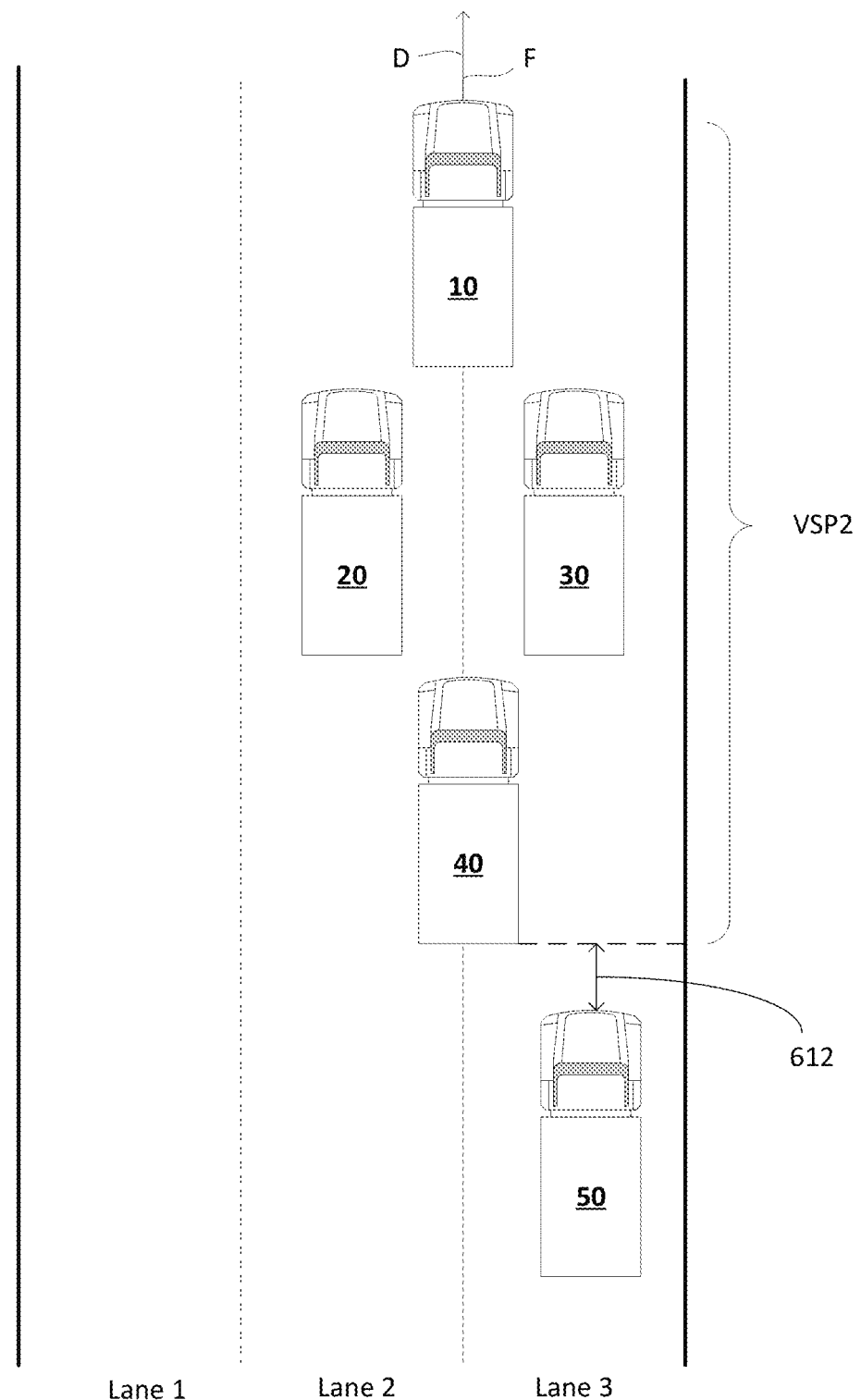
FIGS. 6a and 6b are a schematic depiction illustrating a sequential rearrangement of a platoon from the second non-linear, non-columnar V-shaped platoon arrangement VSP2 of FIG. 5b into a third non-linear, non-columnar V-shaped platoon arrangement VSP3 in accordance with an example embodiment.
Figure 6B:
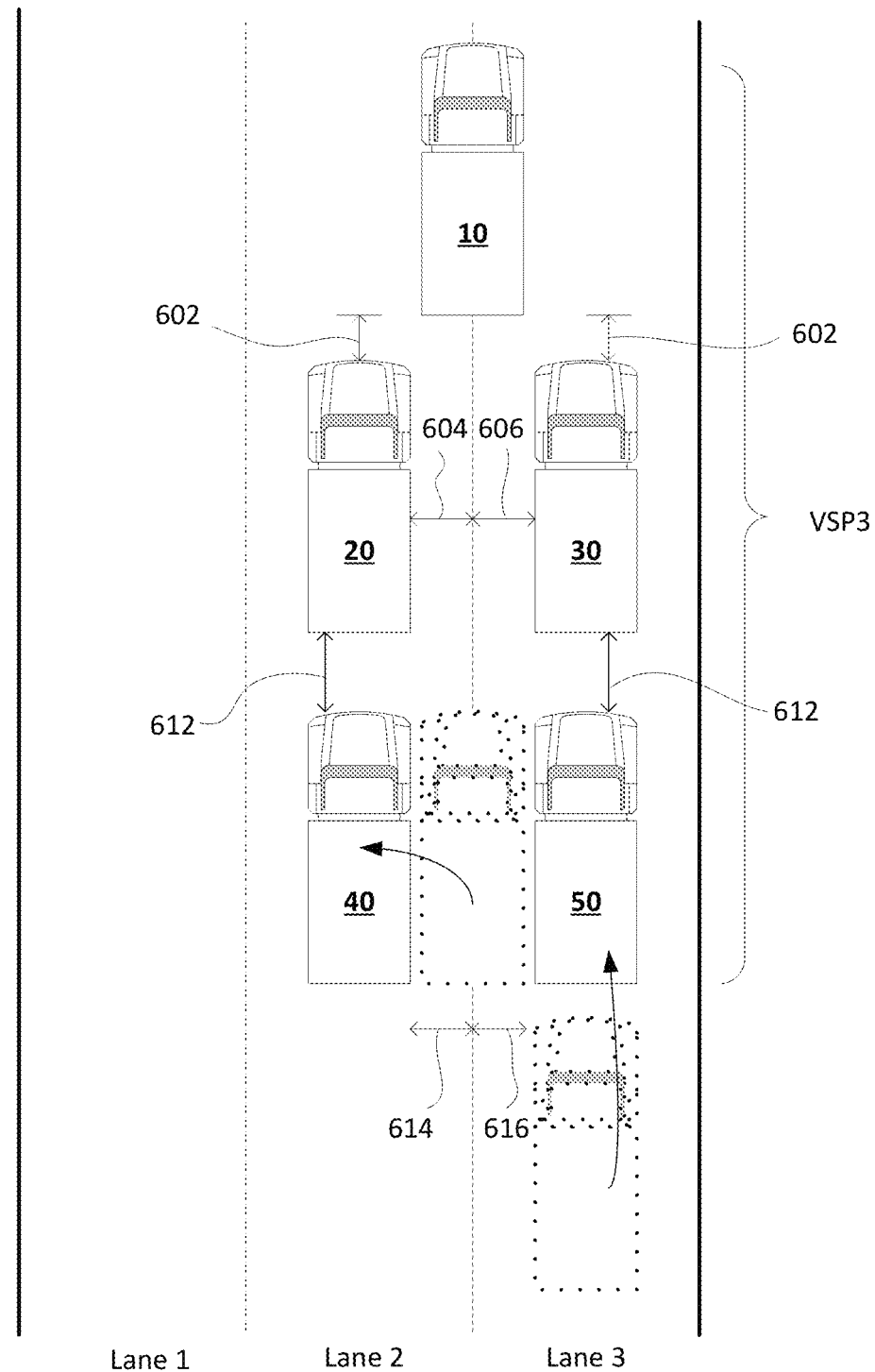

FIGS. 6a and 6b are a schematic depiction illustrating a sequential rearrangement of a platoon from the second non-linear, non-columnar V-shaped platoon arrangement VSP2 of FIG. 5b into a third non-linear, non-columnar V-shaped platoon arrangement VSP3 in accordance with an example embodiment.

In FIG. 6a the second and third vehicles 20, 30 follow behind the leader vehicle 10 travelling spanning lanes Lane2, Lane3 on an associated roadway 10 along a forward path F in a first forward direction D by a following or longitudinal gap distance 602. The following or longitudinal gap distance 602 is parallel to the first forward direction D and the path of travel F of the leading vehicle. The leader vehicle 10 is provided with an electronic control system of the type described above which includes a data collection and communication module portion of the type described above and a platooning control portion also of the type described above. Similarly, the follower vehicles 20, 30, 40, 50 are each also provided with an electronic control system which includes a data collection and communication module portion 200' and a platooning control portion 300'. In the example embodiments to be described herein, each of the two or more vehicles comprising the various platoons that will be described include the same or equivalent electronic control system 5, the same or equivalent data collection and communication module portion 200, and the same or equivalent platooning control portion 300, although other control systems having the functionality to be described herein may equivalently be used as necessary or desired.

In FIG. 6b the second and third vehicles 20, 30 follow behind the leader vehicle 10 travelling spanning lanes Lane2, Lane3 on an associated roadway 10 along a forward path F in a first forward direction D by both a following or longitudinal gap distance 602 as well as a lateral offset distances 604, 606. The following or longitudinal gap distance 602 is parallel to the first forward direction D and the path of travel F of the leading vehicle. The lateral offset distances 604, 606 are perpendicular to the first forward direction D and the path of travel F of the leading vehicle. The leading vehicle 10 has shifted to the left as viewed in the Figure to span the right lane pair Lane2, Lane3 of the roadway. Also the following vehicle 20 has shifted to the left as viewed in the Figure to be centered in the middle lane Lane2 of the roadway. The other following vehicle 30 in the second row remains in FIG. 6b centered in the rightmost lane Lane3. A fourth following vehicle 40 has shifted to the left as viewed in the Figure to be centered in the middle lane Lane2 of the roadway. The other following vehicle 50 in the third row remains in FIG. 6b centered in the rightmost lane Lane3

FIG. 6b shows the completed reorganization from the platoon VSP2 of FIG. 5b into a third V-shaped non-linear and non-columnar platoon VSP3 in accordance with an example embodiment. In FIG. 6b the second and third vehicles 20, 30 follow behind the leader vehicle 10 travelling spanning lanes Lane2, Lane3 on the associated roadway 10 along the forward path F in the first forward direction D by both a following or longitudinal gap distance 602 as well as a lateral offset distances 504, 506. The following or longitudinal gap distance 502 is parallel to the first forward direction D and the path of travel F of the leading vehicle. The lateral offset distances 604, 606 are perpendicular to the first forward direction D and the path of travel F of the leading vehicle. Further in FIG. 6b the fourth and fifth vehicles 40, 50 follow behind the second and third vehicles 20, 30 centered in the middle and rightmost lanes Lane2, Lane3 by both a following or longitudinal gap distance 612 as well as a lateral offset distances 614, 616. The following or longitudinal gap distance 612 is parallel to the first forward direction D and the path of travel F of the leading vehicle. The lateral offset distances 604, 606 are perpendicular to the first forward direction D and the path of travel F of the leading vehicle. In the example embodiment, the lateral offset distances 614, 616 perpendicular to the first forward direction D and the path of travel F of the leading vehicle are the same thereby making the resultant V-shaped platoon VSP3 symmetrical about the forward path F of the leading vehicle 10. The leading vehicle 10 has shifted to the left as viewed in the Figure to span the right lane pair Lane2, Lane3 of the roadway. Also the following vehicle 20 in the second row of the platoon VSP3 has shifted to the left as viewed in the Figure to be centered in the middle lane Lane2 of the roadway. The following vehicle 30 in the second row of the platoon VSP3 remains in FIG. 4c centered in the rightmost lane Lane3. The following vehicle 40 in the third row of the platoon VSP3 has shifted to the left as viewed in the Figure to be centered in the middle lane Lane2 of the roadway. The following vehicle 50 in the third row of the platoon VSP3 remains in FIG. 4c centered in the rightmost lane Lane3.

A further following vehicle 40 has also shifted to the left as viewed in the Figure to follow the other following vehicles in a third row and travelling spanning lanes Lane2, Lane3 on the associated roadway 10 along the forward path F in the first forward direction D. The further following vehicle 40 follows the vehciles 20, 30 of the second row by both a following or longitudinal gap distance 512 as well as a lateral offset distances 524, 526. The following or longitudinal gap distance 512 is parallel to the first forward direction D and the path of travel F of the leading vehicle. The lateral offset distances 524, 526 are parallel to the first forward direction D and the path of travel F of the leading vehicle. In the example embodiment, the lateral offset distances 524, 526 perpendicular to the first forward direction D and the path of travel F of the leading vehicle are the same thereby making the resultant V-shaped platoon VSP3 symmetrical about the forward path F of the leading vehicle 10.

The forward and rearward distance sensors 260, 262 are used as may be necessary and/or desired selectively in combination with the lateral and longitudinal offset distance data for effecting the V-shaped platoon VSP3 formation as shown in FIG. 6b. The forward and rearward distance sensors 260, 262 may be selectively used to maintain the first longitudinal gap distance and the first lateral distance between the vehicles for effecting the V-shaped platoon VSP3 formation.

Figure 7A:
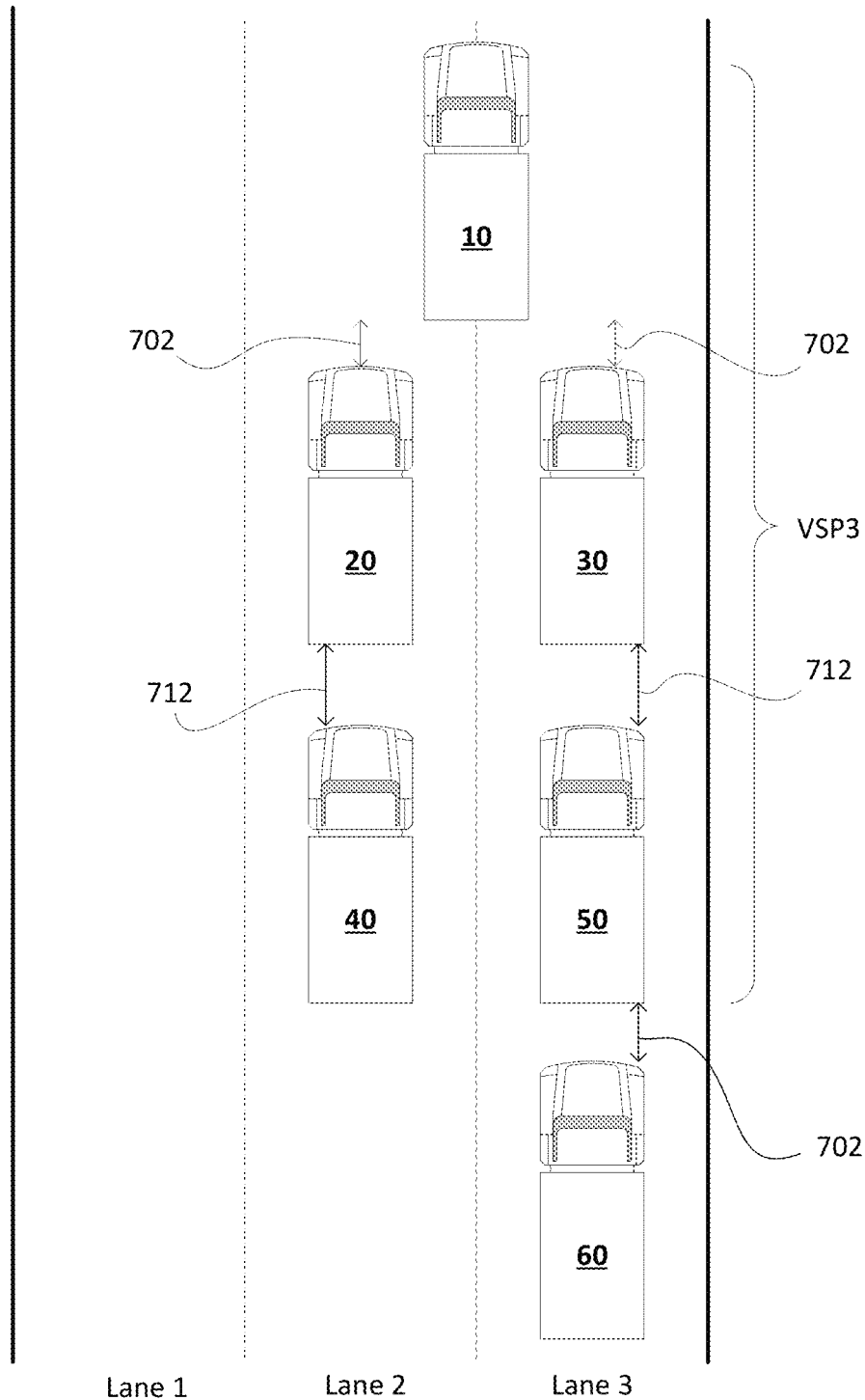
FIGS. 7a-7c are a schematic depiction illustrating a sequential rearrangement of a platoon from the third non-linear, non-columnar V-shaped platoon arrangement VSP3 of FIG. 6b into a fourth non-linear, non-columnar V-shaped platoon arrangement VSP4 in accordance with an example embodiment.
Figure 7B:
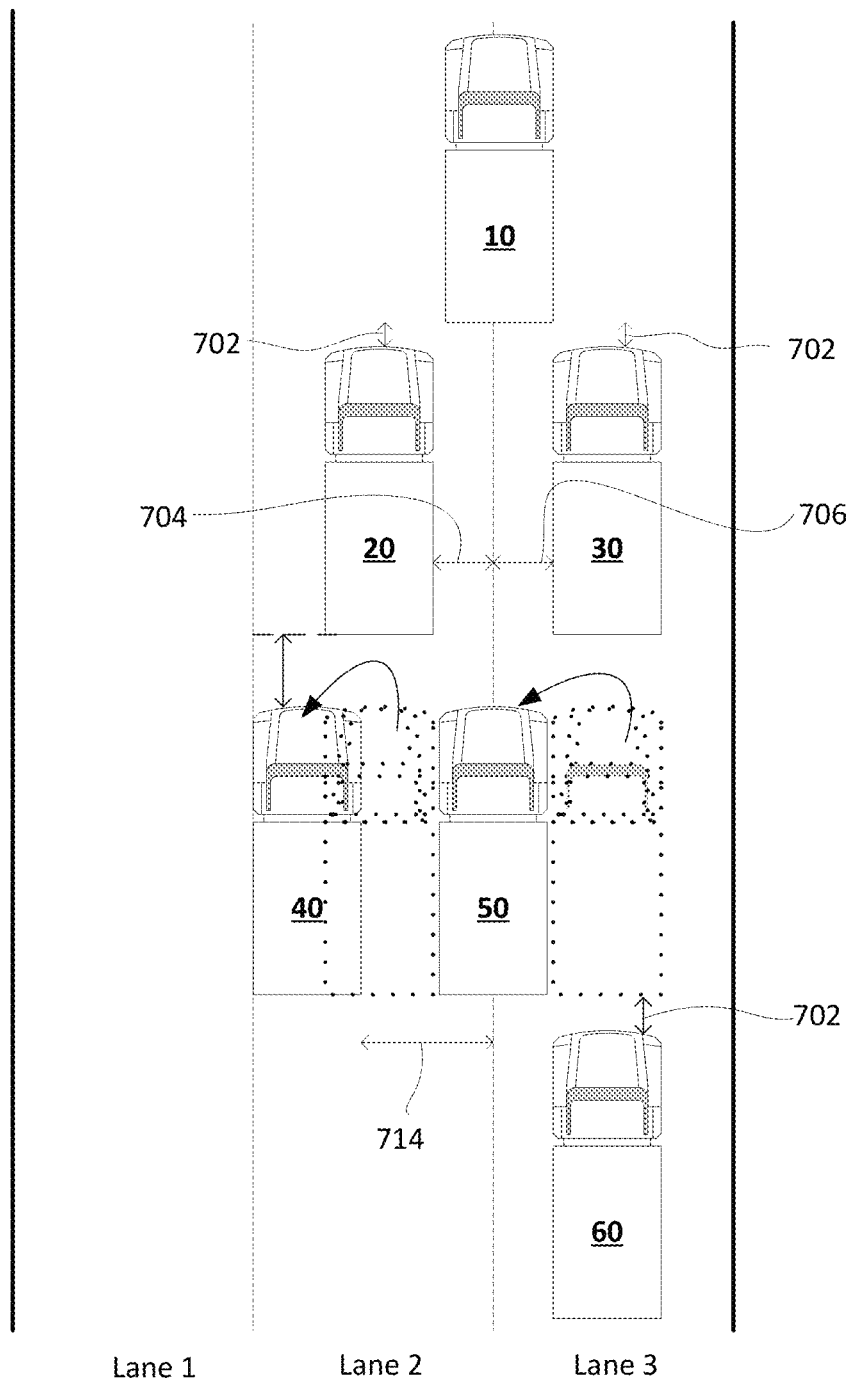
Figure 7C:
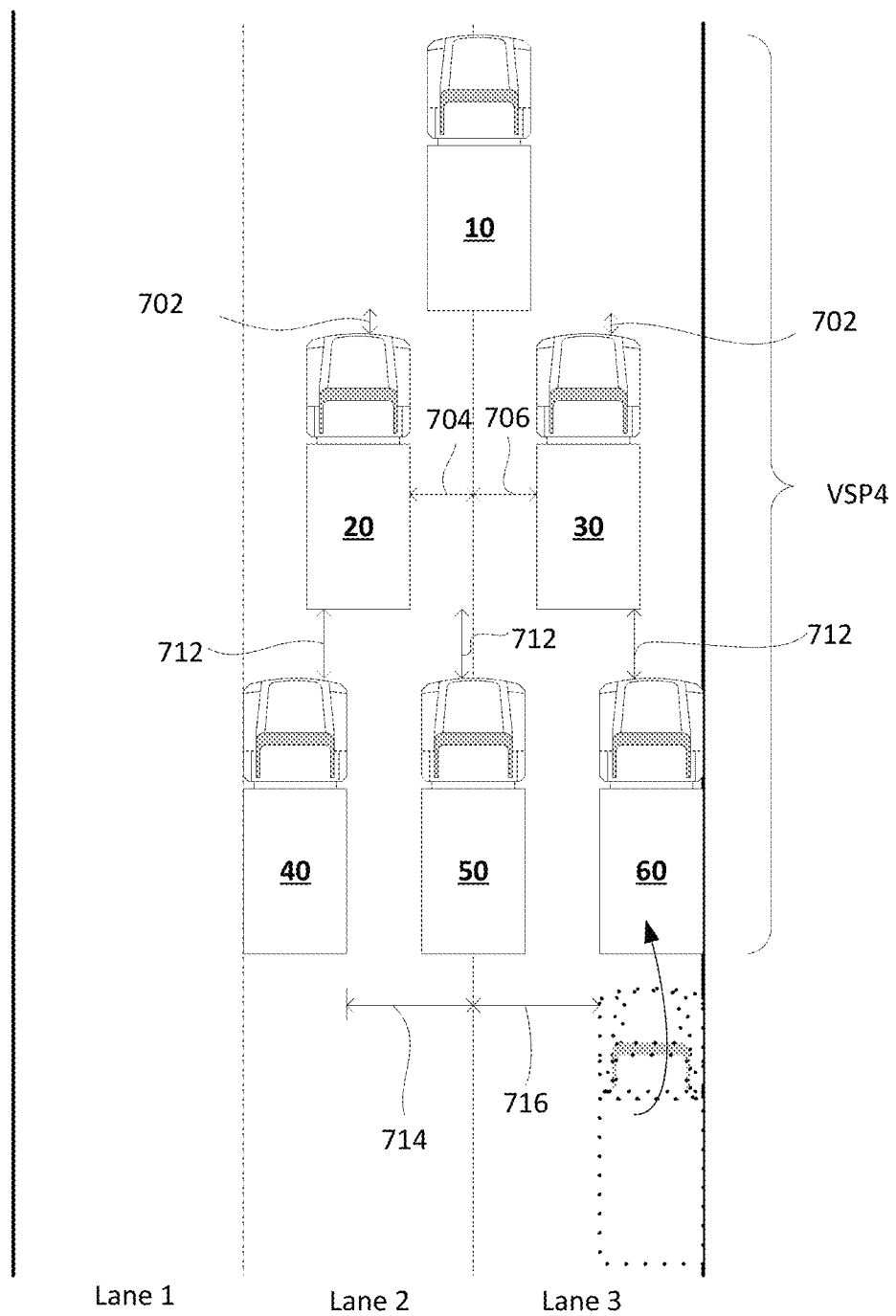

FIGS. 7a-7c are a schematic depiction illustrating a sequential rearrangement of a platoon from the third non-linear, non-columnar V-shaped platoon arrangement VSP3 of FIG. 6b into a fourth non-linear, non-columnar V-shaped platoon arrangement VSP4 in accordance with an example embodiment.

In FIG. 7a the second and third vehicles 20, 30 follow in a second row behind the leader vehicle 10 travelling spanning lanes Lane2, Lane3 on an associated roadway 10 along a forward path F in a first forward direction D by a following or longitudinal gap distance 702. The following or longitudinal gap distance 702 is parallel to the first forward direction D and the path of travel F of the leading vehicle. Similarly, fourth 40 and fifth 50 vehicles 40, 50 follow in a third row behind the second and third vehicles 20, 30 centered in the middle and leftmost lanes Lane2, Lane3, respectively, and by a following or longitudinal gap distance 712. The leader vehicle 10 is provided with an electronic control system of the type described above which includes a data collection and communication module portion of the type described above and a platooning control portion also of the type described above. Similarly, the follower vehicles 20, 30, 40, 50, 60 are each also provided with an electronic control system which includes a data collection and communication module portion 200' and a platooning control portion 300'. In the example embodiments to be described herein, each of the two or more vehicles comprising the various platoons that will be described include the same or equivalent electronic control system 5, the same or equivalent data collection and communication module portion 200, and the same or equivalent platooning control portion 300, although other control systems having the functionality to be described herein may equivalently be used as necessary or desired.

In FIG. 7b the second and third vehicles 20, 30 follow behind the leader vehicle 10 travelling spanning lanes Lane2, Lane3 on an associated roadway 10 along a forward path F in a first forward direction D by both a following or longitudinal gap distance 702 as well as a lateral offset distances 704, 706. The following or longitudinal gap distance 702 is parallel to the first forward direction D and the path of travel F of the leading vehicle. The lateral offset distances 704, 706 are perpendicular to the first forward direction D and the path of travel F of the leading vehicle. In the example embodiment the lateral offset distances 704, 706 are the same providing for symmetry in the non-columnar formation. The leading vehicle 10 has shifted to the left as viewed in the Figure to span the right lane pair Lane2, Lane3 of the roadway. Also the following vehicle 20 has shifted to the left as viewed in the Figure to be centered in the middle lane Lane2 of the roadway. The other following vehicle 30 in the second row remains in FIG. 7b centered in the rightmost lane Lane3. The fourth following vehicle 40 has shifted to the left as viewed in the Figure to be positioned at the extreme left edge of the middle lane Lane2 of the roadway. The other following vehicle 50 in the third row has shifted to the left as viewed in the Figure to be positioned like the leading vehicle 10 spanning lanes Lane2, Lane3 on the associated roadway 10 thereby providing sufficient room or space for the sixth vehicle 60 to join the third row of the platoon VSP4.

FIG. 7c shows the completed reorganization from the platoon VSP3 of FIG. 6b into a fourth V-shaped non-linear and non-columnar platoon VSP4 in accordance with an example embodiment. In FIG. 7c the second and third vehicles 20, 30 follow behind the leader vehicle 10 travelling spanning lanes Lane2, Lane3 on the associated roadway 10 along the forward path F in the first forward direction D by both a following or longitudinal gap distance 702 as well as a lateral offset distances 704, 706. The following or longitudinal gap distance 702 is parallel to the first forward direction D and the path of travel F of the leading vehicle. The lateral offset distances 704, 706 are perpendicular to the first forward direction D and the path of travel F of the leading vehicle. The second and third vehicles 20, 30 are centered in the middle and rightmost lanes Lane2, Lane3, respectively. Further in FIG. 7c the fourth, fifth, and sixth vehicles 40, 50, 60 follow in a third row behind the second and third vehicles 20, 30 of the second row by both a following or longitudinal gap distance 712 as well as a lateral offset distances 714, 716. The following or longitudinal gap distance 712 is parallel to the first forward direction D and the path of travel F of the leading vehicle. The lateral offset distances 714, 716 are perpendicular to the first forward direction D and the path of travel F of the leading vehicle. In the example embodiment, the lateral offset distances 714, 716 perpendicular to the first forward direction D and the path of travel F of the leading vehicle are the same thereby making the resultant V-shaped platoon VSP4 symmetrical about the forward path F of the leading vehicle 10.

The leading vehicle 10 has shifted to the left as viewed in the Figure to span the right lane pair Lane2, Lane3 of the roadway. Also the following vehicle 20 in the second row of the platoon VSP4 has shifted to the left as viewed in the Figure to be centered in the middle lane Lane2 of the roadway. The following vehicle 30 in the second row of the platoon VSP4 remains in FIG. 7c centered in the rightmost lane Lane3. The following vehicle 40 in the third row of the platoon VSP4 has shifted to the extreme left of the middle lane Lane2 as viewed in the Figure to provide room for three (3) vehicles in the third row while yet remaining contained within the lane pair Lane2, Lane3. Similarly, following vehicle 60 in the third row of the platoon VSP4 has shifted to the extreme right of the right lane Lane3 as viewed in the Figure to provide room for three (3) vehicles in the third row while yet remaining contained within the lane pair Lane2, Lane3. Lastly, the following vehicle 50 in the third row of the platoon VSP3 has shifted to the left as viewed in FIG. 7c to span the right lane pair Lane2, Lane3 of the roadway.

With continued reference to FIGS. 7a-7c, a second communication interface of the communication transmitter of the system is operable to transmit, to a second set (R2) of third, fourth, and fifth following vehicles (40, 50, 60) of the plurality of following vehicles a second lateral offset distance signal ($2^{nd}$\_Lat\_Off\_Sig) and a second longitudinal gap distance signal ($2^{nd}$\_Long\_Off\_Sig). The second lateral offset distance signal ($2^{nd}$\_Lat\_Off\_Sig) comprises second lateral offset distance data ($2^{nd}$\_Lat\_Off) representative of second lateral offset distances ($2^{nd}$\_Offsets) in a direction perpendicular to the forward path (F) and offset from the forward path (F) to be maintained in the non-linear platoon (VSP3) by each of the third, fourth, and fifth following vehicles (40, 50, 60) of the second set (R2). The second longitudinal gap distance signal ($2^{nd}$\_Long\_Off\_Sig) comprises second longitudinal gap distance data ($2^{nd}$\_Long\_Off) representative of second longitudinal gap distances ($2^{nd}$\_Gaps) in a direction along the first direction (D) to be maintained in the non-linear platoon (VSP3) by the each of the third, fourth, and fifth following vehicles (40, 50, 60) of the second set (R2) relative to the first and second vehicles (20, 30) of the first set (R1).

In addition, the logic of the platoon control unit is executable by the processor to generate the second lateral offset distance data ($2^{nd}$\_Lat\_Off), the second longitudinal gap distance data ($2^{nd}$\_Long\_Off), and the reorganization initiation signal (Reorg) in accordance with a predetermined combination of the global position data (GPS\_Data) representative of the position of the associated leading vehicle (10) relative to the associated geographical area and the performance data (Perform\_Data) representative of the one or more performance characteristics of the plurality of associated following vehicles (20, 30, 40, 50, 60, . . . ).

Yet still further in the example embodiment, the communication receiver of the system is operable to receive, as the performance capability signals (Perform\_Sig), braking performance capability signals (BRK\_Perform\_Sig) from the plurality of associated following vehicles (20, 30, 40, 50, 60, . . . ). In the embodiment, the braking performance capability signals (BRK\_Perform\_Sig) comprise braking performance data (BRK\_Perform\_Data) representative of braking capabilities of the plurality of associated following vehicles (20, 30, 40, 50, 60, . . . ).

Also, the logic of the platoon control unit is executable by the processor to generate the first lateral offset distance data ($1^{st}$\_Lat\_Off), the first longitudinal gap distance data ($1^{st}$\_Long\_Off), the first lateral offset distance data ($1^{st}$\_Lat\_Off), the first longitudinal gap distance data ($1^{st}$\_Long\_Off), and the reorganization initiation signal (Reorg) in accordance with a predetermined combination of the global position data (GPS\_Data) representative of the position of the associated leading vehicle (10) relative to the associated geographical area and the braking performance data (BRK\_Perform\_Data) representative of the braking capabilities of the plurality of associated following vehicles (20, 30, 40, 50, 60, . . . ).

The forward and rearward distance sensors 260, 262 are used as may be necessary and/or desired selectively in combination with the lateral and longitudinal offset distance data for effecting the V-shaped platoon VSP4 formation as shown in FIG. 7c. The forward and rearward distance sensors 260, 262 may be selectively used to maintain the first longitudinal gap distance and the first lateral distance between the vehicles for effecting the V-shaped platoon VSP4 formation.

Figure 8:
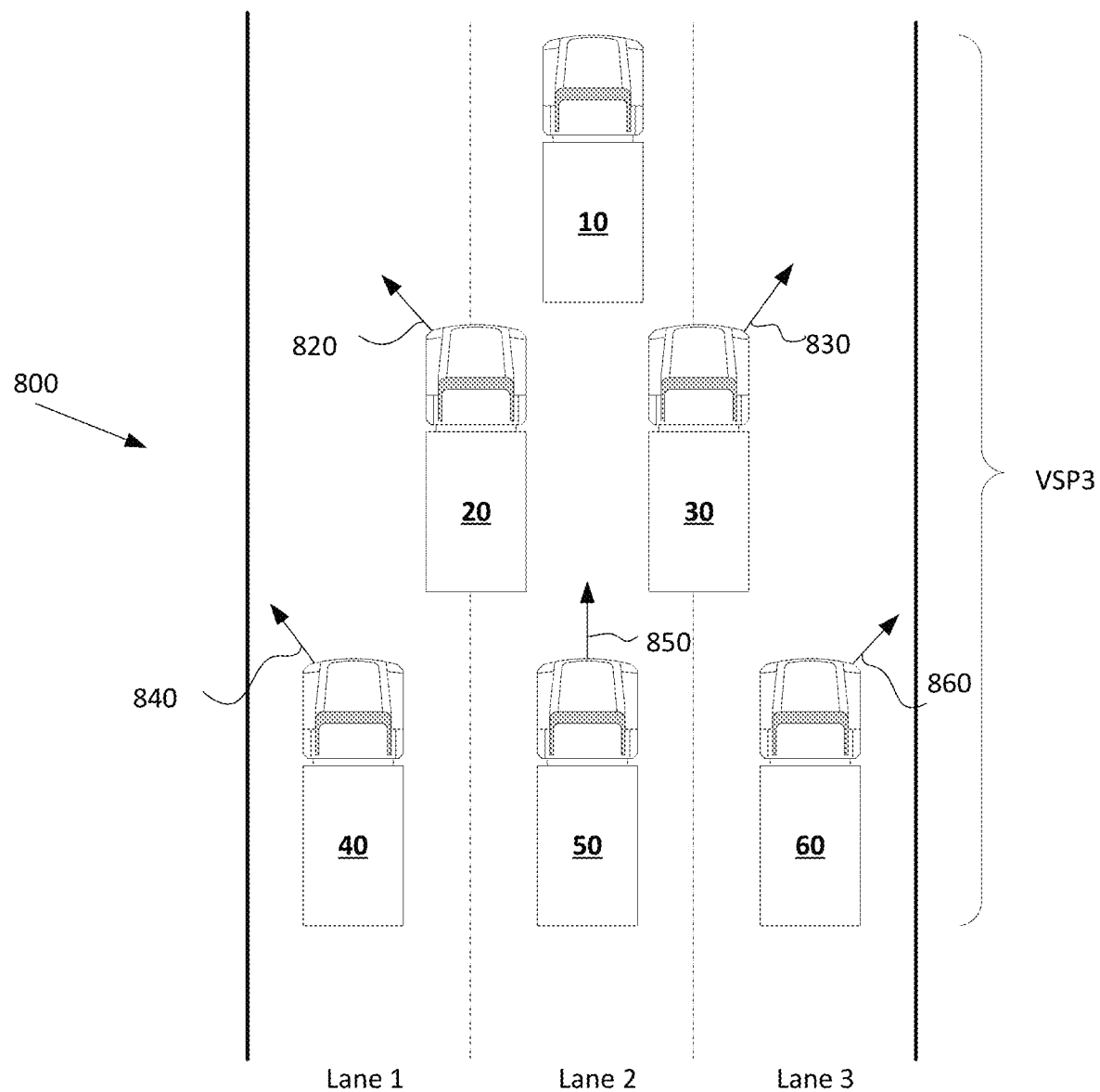
FIG. 8 is a schematic illustration showing escape paths provided to vehicles participating in the fourth non-linear, non-columnar V-shaped platoon arrangement of FIG. 7c in accordance with an embodiment.

FIG. 8 is a schematic illustration showing escape paths provided to vehicles participating in the fourth non-linear, non-columnar V-shaped platoon arrangement of FIG. 7c in accordance with an embodiment. In this example embodiment, a third communication interface of the communication transmitter of the system is operable to transmit, to the first set (R1) of first and second following vehicles (20, 30) of the plurality of following vehicle and to the second set (R2) of third, fourth, and fifth following vehicles (40, 50, 60) of the plurality of following vehicles an emergency brake command signal (Emerg\_Brake\_Sig) and an emergency brake command direction signal (Emerg\_Brake\_Dir\_Sig). The emergency brake command signal (Emerg\_Brake\_Sig) comprises emergency brake command data (Emerg\_Brake) representative of deceleration command data selectively usable by the first and second sets of following vehicles (R1, R2) to effect an emergency deceleration operation. The emergency brake command direction signal (Emerg\_Brake\_Dir\_Sig) comprises emergency brake command direction data (Emerg\_Brake\_Dir) representative of deceleration command direction data (820, 830, 840, 850, 860) selectively usable by the first and second sets of following vehicles (R1, R2) to implement the emergency deceleration operation.

Further in an example embodiment the logic of the platoon control unit is executable by the processor to generate the emergency brake command data (Emerg\_Brake), and the emergency brake command direction data (Emerg\_Brake\_Dir) in accordance with a predetermined combination of the one or more conditions of the associated roadway and/or the associated geographical area.

Figure 9:
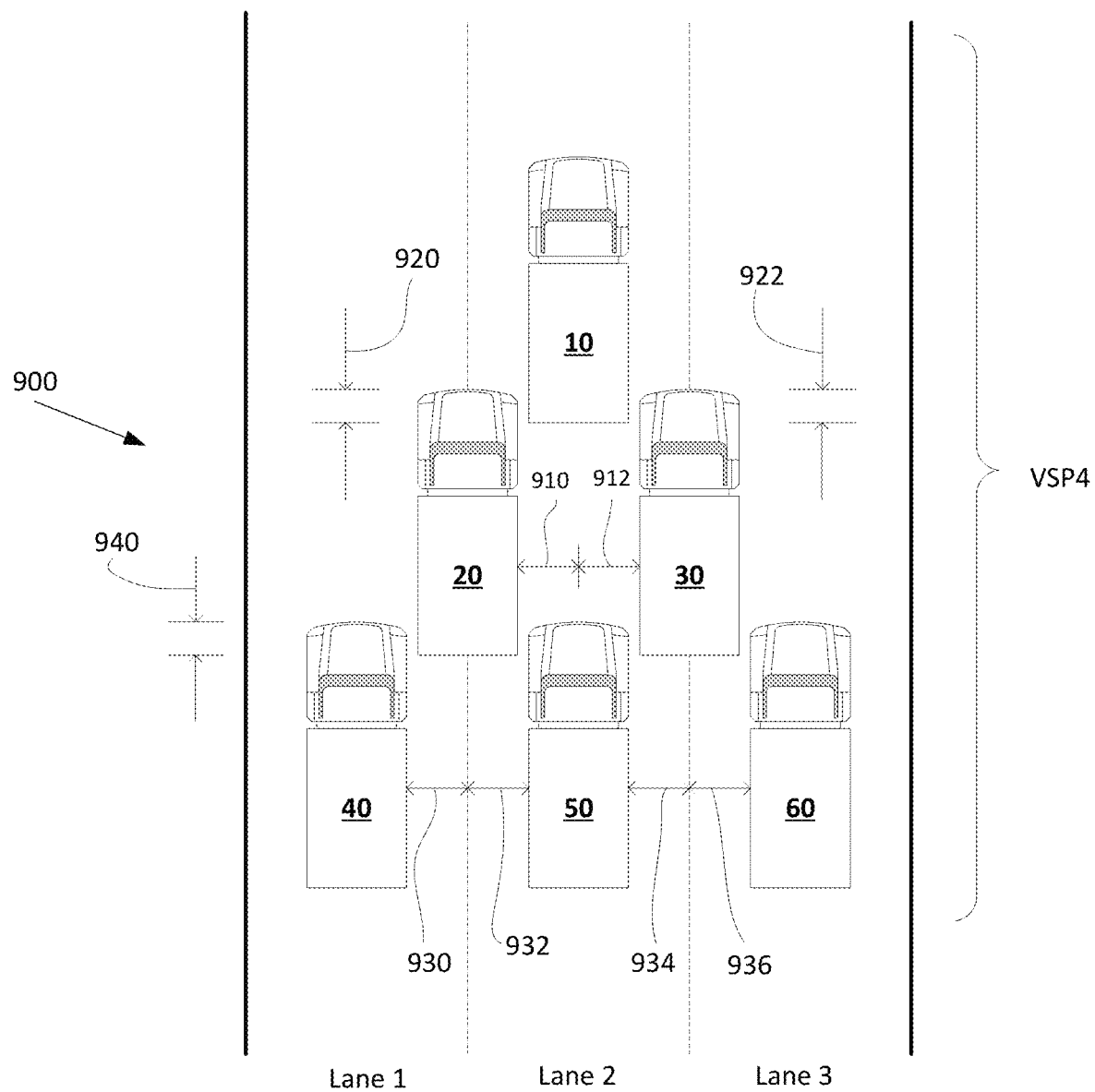
FIG. 9 is a schematic illustration showing a fifth non-linear, non-columnar V-shaped platoon arrangement in accordance with an embodiment.

FIG. 9 is a schematic illustration showing a fifth non-linear, non-columnar V-shaped platoon arrangement in accordance with an embodiment. The first communication interface of the system according to example embodiment is operable responsive to reorganization initiate signal (Reorg) to selectively transmit, to the first set (R1) of first and second following vehicles (20, 30) of the plurality of following vehicles a first lateral offset distance signal ($1^{st}$\_Lat\_Off\_Sig) and a first longitudinal overlap distance signal ($1^{st}$\_Interleave\_sig). The first lateral offset distance signal ($1^{st}$\_Lat\_Off\_Sig) comprises first lateral offset distance data ($1^{st}$\_Lat\_Off) representative of first lateral offset distances 910, 912 ($1^{st}$\_Offsets) in a direction perpendicular to the forward path (F) offset from the forward path (F) to be maintained in the non-linear platoon (VSP4) in the non-linear platoon (VSP4) by each of the second and third following vehicles (20, 30) of the first set (R1). The first longitudinal overlap distance signal ($1^{st}$\_Interleave\_sig) comprises first longitudinal overlap distance data ($1^{st}$\_Interleave) representative of longitudinal overlap distances 920, 922 ($1^{st}$\_Overlaps) in a direction along the first direction (D) to be maintained in the non-linear platoon (VSP4) by the each of the first and second vehicles (20, 30) of the first set (R1) interleaved in the first direction (D) relative to the leader vehicle (10).

In addition, in this example embodiment, a second communication interface of the communication transmitter is operable responsive to the reorganization initiate signal (Reorg) to selectively transmit, to a second set (R2) of third, fourth, and fifth following vehicles (40, 50, 60) of the plurality of following vehicles a second lateral offset distance signal ($2^{nd}$\_Lat\_Off\_Sig) and a second longitudinal overlap distance signal ($2^{nd}$\_Interleave\_Sig). The second lateral offset distance signal ($2^{nd}$\_Lat\_Off\_Sig) comprises second lateral offset distance data ($2^{nd}$\_Lat\_Off) representative of second lateral offset distances 930, 932, 934, 936 ($2^{nd}$\_Offsets) in a direction perpendicular to the forward path (F) offset from the forward path (F) to be maintained in the non-linear platoon (VSP4) in the non-linear platoon (VSP4) by each of the third, fourth, and fifth following vehicles (40, 50, 60) of the second set (R2). The second longitudinal overlap distance signal ($2^{nd}$_Interleave_Sig) comprises second longitudinal overlap distance data ($2^{nd}$_Interleave) representative of longitudinal overlap distances 940 ($2^{nd}$_Overlaps) in a direction along the first direction (D) to be maintained in the non-linear platoon (VSP4) by the each of the third, fourth, and fifth following vehicles (40, 50, 60) of the second set (R2) interleaved in the first direction (D) relative to the first and second vehicles (20, 30) of the first set (R1).

Yet still further relative to this example embodiment, the logic of the platoon control unit is executable by the processor to generate the first longitudinal overlap distance data ($1^{st}$_Interleave), the second longitudinal overlap distance data ($2^{nd}$_Interleave), the second lateral offset distance data ($2^{nd}$_Lat_Off), and the reorganization initiation signal (Re-org) in accordance with a predetermined combination of the global position data (GPS_Data) representative of the position of the associated leading vehicle (10) relative to the associated geographical area and the performance data (Perform_Data) representative of the one or more performance characteristics of the plurality of associated following vehicles.

In addition, the communication receiver of the system is operable to receive, as the performance capability signals (Perform_Sig), braking performance capability signals (BRK_Perform_Sig) from the plurality of associated following vehicles (20, 30, 40, 50, 60, . . . ). In the example embodiment, the braking performance capability signals (BRK_Perform_Sig) comprise braking performance data (BRK_Perform_Data) representative of braking capabilities of the plurality of associated following vehicles.

The logic of the platoon control unit is executable by the processor to generate the first lateral offset distance data ($1^{st}$_Lat_Off), the first longitudinal overlap distance data ($1^{st}$_Interleave), the second longitudinal overlap distance data ($2^{nd}$_Interleave), and the second lateral offset distance data ($2^{nd}$_Lat_Off) in accordance with a predetermined combination of the global position data (GPS_Data) representative of the position of the associated leading vehicle (10) relative to the associated geographical area and the braking performance data (BRK_Perform_Data) representative of the braking capabilities of the plurality of associated following vehicles (20, 30, 40, 50, 60, . . . ).

Figure 10:
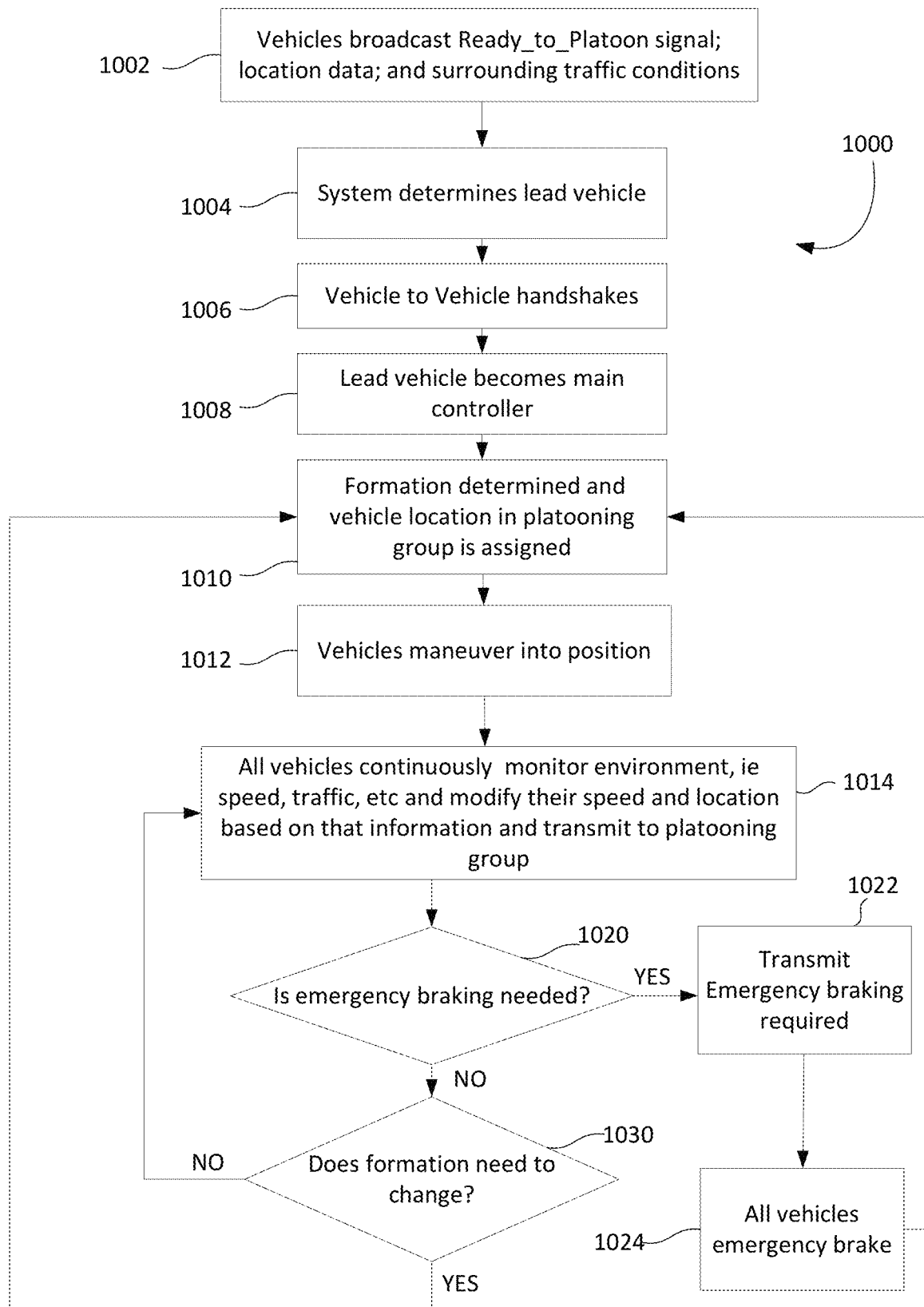
FIG. 10 is a flow diagram showing a method of rearranging a platoon from a standard linear column-type platoon arrangement into a non-linear, non-columnar V-shaped platoon arrangement in accordance with an example embodiment.

FIG. 10 is a flow diagram showing a method 1000 of rearranging a platoon from a standard linear column-type platoon arrangement into a non-linear, non-columnar V-shaped platoon arrangement in accordance with an example embodiment.

In one example, executable instructions associated with performing a method may be embodied as a logic encoded in one or more tangible media for execution. When executed, the instructions may perform a method. Thus, in one example, a logic encoded in one or more tangible media may store computer executable instructions that if executed by a machine (e.g., processor) cause the machine to perform method 1000. While executable instructions associated with the above method are described as being embodied as a logic encoded in one or more tangible media, it is to be appreciated that executable instructions associated with other example methods described herein may also be stored on a tangible media.

The method 1000 illustrated in FIG. 10 is operable to rearrange a platoon from a standard linear column-type platoon arrangement into a non-linear, non-columnar V-shaped platoon arrangement in accordance with an example embodiment. In step 1002 the vehicles 10, 20, 30, 40, 50, 60, broadcast their locations, a desire to platoon, and other information such as, for example, physical and other conditions surrounding their respective vehicles. The vehicles 10, 20, 30, 40, 50, 60 acting as a group select or otherwise determine in step 1004 a lead vehicle 10 of the group. Mutual command and other informational data is further exchanged in step 1006 whereupon in step 1008 the lead vehicle 10 assumes the main controller of the group of controllers.

The non-columnar platoon shape or format is determined by the group of vehicles at step 1010, and appropriate commands and other information as described above is distributed or otherwise shared in step 1012 by and among the vehicles 10, 20, 30, 40, 50, 60, etc. of the platoon. The vehicles monitor the environmental conditions in step 1014 and distribute or otherwise share the information as necessary and/or desired.

Emergency braking determination occurs in step 1020. Here, if an emergency braking operation is determined to be needed, an emergency brake command signal (Emerg_Brake_Sig) is transmitted. The emergency brake command signal (Emerg_Brake_Sig) comprises emergency brake command data (Emerg_Brake) representative of deceleration command data selectively usable by the first and second sets of following vehicles (R1, R2) to effect an emergency deceleration operation. In addition, an emergency brake command direction signal (Emerg_Brake_Dir_Sig) is generated and transmitted comprising emergency brake command direction data (Emerg_Brake_Dir) representative of deceleration command direction data (820, 830, 840, 850, 860) selectively usable by the first and second sets of following vehicles (R1, R2) to implement the emergency deceleration operation. The logic of the platoon control unit is executable by the processor to generate the emergency brake command data (Emerg_Brake), and the emergency brake command direction data (Emerg_Brake_Dir) in accordance with a predetermined combination of the one or more conditions of the associated roadway and/or the associated geographical area.

Platoon re-formation is selectively determined in step 1030 based for example on changing road conditions, changing traffic conditions, lane format changes, local changes related to the geographical area as determined from the GPS data, or the like.

It is to be understood that other embodiments will be utilized and structural and functional changes will be made without departing from the scope of the present invention. The foregoing descriptions of embodiments of the present invention have been presented for the purposes of illustration and description. It is not intended to be exhaustive or to limit the invention to the precise forms disclosed. Accordingly, many modifications and variations are possible in light of the above teachings. It is therefore intended that the scope of the invention be limited not by this detailed description.

The invention claimed is:

1. A system operable in associated platooning vehicles comprising an associated leading vehicle and a plurality of associated following vehicles cooperatively travelling as a first platoon in an associated geographical area on an associated roadway in a first direction defined by the associated leading vehicle along a forward path for controlling reorganization of the platooning vehicles from the first platoon to a non-linear platoon, the system comprising:
  a platoon control unit configured to be disposed in the associated leading vehicle, the platoon control unit comprising:

a processor;

a non-transient memory device operatively coupled with the processor; and logic stored in the non-transient memory and executable by the processor to selectively reorganize the platooning vehicles;

a communication receiver operatively coupled with the platoon control unit, the communication receiver being operable to:

receive performance capability signals from one or more of the plurality of associated following vehicles, the performance capability signals comprising performance data representative of one or more performance characteristics of the one or more of the plurality of associated following vehicles;

a global position sensor (GPS) receiver operatively coupled with the platoon control unit, the GPS receiver being operable to:

receive a global position signal from an associated source of global position information, the global position signal comprising global position data representative of a position of the associated leading vehicle relative to the associated geographical area; and a communication transmitter operatively coupled with the platoon control unit, the transmitter comprising:

a first communication interface, the first communication interface being responsive to a reorganization initiate signal to selectively transmit, to a first set of first and second following vehicles of the plurality of following vehicles:

a first lateral offset distance signal comprising first lateral offset distance data representative of first lateral offset distances in a direction perpendicular to the forward path and offset from the forward path to be maintained in the non-linear platoon by each of the first and second vehicles of the first set relative to the forward path; and a first longitudinal overlap distance signal comprising first longitudinal overlap distance data representative of longitudinal overlap distances in a direction along the first direction to be maintained in the non-linear platoon by the each of the first and second vehicles of the first set overlappinq the associated leading vehicle in the first direction, wherein the logic of the platoon control unit is executable by the processor to generate the first lateral offset distance data and the first longitudinal overlap distance data in accordance with a predetermined combination of the global position data representative of the position of the associated leading vehicle relative to the associated geographical area, the performance data representative of the one or more performance characteristics of the plurality of associated following vehicles, and the reorganization initiate signal.

2. The system according to claim 1, wherein:

the communication receiver is operable to receive, as the performance capability signals, braking performance capability signals from the plurality of associated following vehicles, the braking performance capability signals comprising braking performance data representative of braking capabilities of the plurality of associated following vehicles; and the logic of the platoon control unit is executable by the processor to generate the first lateral offset distance data and the first longitudinal overlap distance data in accordance with a predetermined combination of the global position data representative of the position of the associated leading vehicle relative to the associated geographical area and the braking performance data representative of the braking capabilities of the plurality of associated following vehicles.

3. The system according to claim 1, wherein:

the first communication interface is operable to transmit, to the first set of first and second following vehicles:

the first lateral offset distance data representative of a single lateral offset distance in a direction perpendicular to the forward path and offset on opposite sides of the forward path to be maintained in the non-linear platoon by each of the first and second vehicles of the first set relative to the forward path; and the first longitudinal overlap distance data representative of a single longitudinal overlap distance in a direction along the forward direction to be maintained in the non-linear platoon by the each of the first and second vehicles of the first set relative to the leader vehicle.

4. The system according to claim 1, wherein:

the communication transmitter comprises:

a second communication interface operable to transmit, to a second set of third, fourth, and fifth following vehicles of the plurality of following vehicles:

a second lateral offset distance signal comprising second lateral offset distance data representative of second lateral offset distances in a direction perpendicular to the forward path and offset from the forward path to be maintained in the non-linear platoon by each of the third, fourth, and fifth following vehicles of the second set; and a longitudinal gap distance signal comprising longitudinal gap distance data representative of longitudinal gap distances in a direction along the first direction to be maintained in the non-linear platoon by the each of the third, fourth, and fifth following vehicles of the second set relative to the first and second vehicles of the first set;

the logic of the platoon control unit is executable by the processor to generate the second lateral offset distance data, the longitudinal gap distance data, and the reorganization initiation signal in accordance with a predetermined combination of the global position data representative of the position of the associated leading vehicle relative to the associated geographical area and the performance data representative of the one or more performance characteristics of the plurality of associated following vehicles.

5. The system according to claim 4, wherein:

the communication receiver is operable to receive, as the performance capability signals, braking performance capability signals from the plurality of associated following vehicles, the braking performance capability signals comprising braking performance data representative of braking capabilities of the plurality of associated following vehicles; and the logic of the platoon control unit is executable by the processor to generate the first lateral offset distance data, the first longitudinal overlap distance data, the second lateral offset distance data, the longitudinal gap distance data, and the reorganization initiation signal in accordance with a predetermined combination of the global position data representative of the position of the associated leading vehicle relative to the associated geographical area and the braking performance data representative of the braking capabilities of the plurality of associated following vehicles.

6. The system according to claim 4, wherein:
the communication transmitter comprises:
a third communication interface operable to transmit, to the first set of first and second following vehicles of the plurality of following vehicle and to the second set of third, fourth, and fifth following vehicles of the plurality of following vehicles:
an emergency brake command signal comprising emergency brake command data representative of deceleration command data selectively usable by the first and second sets of following vehicles to effect an emergency deceleration operation; and
an emergency brake command direction signal comprising emergency brake command direction data representative of deceleration command direction data selectively usable by the first and second sets of following vehicles to implement the emergency deceleration operation;
the logic of the platoon control unit is executable by the processor to generate the emergency brake command data, and the emergency brake command direction data in accordance with a predetermined combination of the one or more conditions of the associated roadway and/or the associated geographical area.

7. The system according to claim 4, wherein:
the communication receiver is operable to receive, as the performance capability signals, braking performance capability signals from the plurality of associated following vehicles, the braking performance capability signals comprising braking performance data representative of braking capabilities of the plurality of associated following vehicles; and
the logic of the platoon control unit is executable by the processor to generate the first lateral offset distance data, the first longitudinal overlap distance data, the longitudinal gap distance data, and the second lateral offset distance data in accordance with a predetermined combination of the global position data representative of the position of the associated leading vehicle relative to the associated geographical area and the braking performance data representative of the braking capabilities of the plurality of associated following vehicles.

8. A method in a platoon control unit comprising a processor, a non-transient memory device operatively coupled with the processor, and logic stored in the non-transient memory and executable by the processor for controlling reorganization of associated platooning vehicles comprising an associated leading vehicle and a plurality of associated following vehicles cooperatively travelling as a first platoon in an associated geographical area on an associated roadway in a first direction defined by the associated leading vehicle along a forward path from the first platoon to a non-linear platoon, the method comprising:
receiving, by a communication receiver operatively coupled with the platoon control unit, performance capability signals from the plurality of associated following vehicles, the performance capability signals comprising performance data representative of one or more performance characteristics of the plurality of associated following vehicles vehicles;
receiving, by a global position sensor receiver operatively coupled with the platoon control unit, a global position signal from an associated source of global position information, the global position signal comprising global position data representative of a position of the associated leading vehicle relative to the associated geographical area; and
responsive to a reorganization initiate signal, selectively transmitting to a first set of first and second following vehicles of the plurality of following vehicles, by a first communication interface of a communication transmitter operatively coupled with the platoon control unit:
a first lateral offset distance signal comprising first lateral offset distance data representative of first lateral offset distances in a direction perpendicular to the forward path and offset from the forward path to be maintained in the non-linear platoon by each of the first and second vehicles of the first set relative to the forward path; and
a first longitudinal overlap distance signal comprising first longitudinal overlap distance data representative of longitudinal overlap distances in a direction along the first direction to be maintained in the non-linear platoon by the each of the first and second vehicles of the first set overlapping the associated leading vehicle in the first direction; and
executing the logic of the platoon control unit the processor to generate the first lateral offset distance data and the first longitudinal overlap distance data in accordance with a predetermined combination of the global position data representative of the position of the associated leading vehicle relative to the associated geographical area, and the performance data representative of the one or more performance characteristics of the plurality of associated following vehicles, and the reorganization initiate signal.

9. The method according to claim 8, wherein:
the receiving by communication receiver the performance capability signals comprises receiving braking performance capability signals from the plurality of associated following vehicles, the braking performance capability signals comprising braking performance data representative of braking capabilities of the plurality of associated following vehicles; and
the executing the logic by the processor comprises executing the logic to generate the first lateral offset distance data and the first longitudinal overlap distance data in accordance with a predetermined combination of the global position data representative of the position of the associated leading vehicle relative to the associated geographical area and the braking performance data representative of the braking capabilities of the plurality of associated following vehicles.

10. The method according to claim 8, further comprising:
transmitting to the first set of first and second following vehicles by the first communication interface:
the first lateral offset distance data representative of a single lateral offset distance in a direction perpendicular to the forward path and offset on opposite sides of the forward path to be maintained in the non-linear platoon by each of the first and second vehicles, of the first set relative to the forward path; and
the first longitudinal overlap distance data representative of a single longitudinal overlap distance in a direction along the forward direction to be maintained in the non-linear platoon by the each of the first and second vehicles of the first set relative to the leader vehicle.

11. The method according to claim 8, further comprising transmitting, to a second set of third, fourth, and fifth following vehicles of the plurality of following vehicles by a second communication interface of the communication transmitter:
    a second lateral offset distance signal comprising second lateral offset distance data representative of second lateral offset distances in a direction perpendicular to the forward path and offset from the forward path to be maintained in the non-linear platoon by each of the third, fourth, and fifth following vehicles of the second set; and
    a longitudinal gap distance signal comprising longitudinal gap distance data representative of longitudinal gap distances in a direction along the first direction to be maintained in the non-linear platoon by the each of the third, fourth, and fifth following vehicles of the second set relative to the first and second vehicles of the first set; and
    executing the logic of the platoon control unit the processor to generate the second lateral offset distance data, the longitudinal gap distance data, and the reorganization initiation signal in accordance with a predetermined combination of the global position data representative of the position of the associated leading vehicle relative to the associated geographical area and the performance data representative of the one or more performance characteristics of the plurality of associated following vehicles.

12. The method according to claim 11, further comprising:
    receiving, by the communication receiver from the plurality of associated following vehicles as the performance capability signals, braking performance capability signals, the braking performance capability signals comprising braking performance data representative of braking capabilities of the plurality of associated following vehicles; and
    executing the logic of the platoon control unit by the processor to generate the first lateral offset distance data, the first longitudinal overlap distance data, the second lateral offset distance data, the longitudinal gap distance data, and the reorganization initiation signal in accordance with a predetermined combination of the global position data representative of the position of the associated leading vehicle relative to the associated geographical area and the braking performance data representative of the braking capabilities of the plurality of associated following vehicles.

13. The method according to claim 11, further comprising:
    transmitting, to the first set of first and second following vehicles of the plurality of following vehicle and to the second set of third, fourth, and fifth following vehicles of the plurality of following vehicles by a third communication interface of the communication transmitter:
        an emergency brake command signal comprising emergency brake command data representative of deceleration command data selectively usable by the first and second sets of following vehicles to effect an emergency deceleration operation; and
        an emergency brake command direction signal comprising emergency brake command direction data representative of deceleration command direction data selectively usable by the first and second sets of following vehicles to implement the emergency deceleration operation; and
    executing the logic of the platoon control unit by the processor to generate the emergency brake command data, and the emergency brake command direction data in accordance with a predetermined combination of the one or more conditions of the associated roadway and/or the associated geographical.

14. The method according to claim 11, further comprising:
    receiving, by the communication receiver from the plurality of associated following vehicles as the performance capability signals, braking performance capability signals the braking performance capability signals comprising braking performance data representative of braking capabilities of the plurality of associated following vehicles; and
    executing the logic of the platoon control unit by the processor to generate the first lateral offset distance data, the first longitudinal overlap distance data, the longitudinal gap distance data, and the second lateral offset distance data in accordance with a predetermined combination of the global position data representative of the position of the associated leading vehicle relative to the associated geographical area and the braking performance data representative of the braking capabilities of the plurality of associated following vehicles.

15. A non-transitory computer-readable storage medium storing a set of instructions for controlling reorganization of a plurality of associated following vehicles cooperatively travelling as a first platoon in an associated geographical area on an associated roadway in a first direction defined by the associated leading vehicle along a forward path from the first platoon to a non-linear platoon, the instructions, when executed by one or more processors, causing the one or more processors to perform a method comprising:
    receiving performance capability signals from the plurality of associated following vehicles, the performance capability signals comprising performance data representative of one or more performance characteristics of the plurality of associated following vehicles;
    receiving a global position signal from an associated source of global position information, the global position signal comprising global position data representative of a position of the associated leading vehicle relative to the associated geographical area; and
    responsive to a reorganization initiate signal, selectively transmitting to a first set of first and second following vehicles of the plurality of following vehicles:
        a first lateral offset distance signal comprising first lateral offset distance data representative of first lateral offset distances in a direction perpendicular to the forward path and offset from the forward path to be maintained in the non-linear platoon by each of the first and second vehicles of the first set relative to the forward path; and
        a first longitudinal overlap distance signal comprising first longitudinal overlap distance data representative of longitudinal overlap distances in a direction along the first direction to be maintained in the non-linear platoon by the each of the first and second vehicles of the first set overlapping the associated leading vehicle in the first direction; and
    executing the set of instructions to generate the first lateral offset distance data and the first longitudinal overlap distance data in accordance with a predetermined combination of the global position data representative of the position of the associated leading vehicle relative to the associated geographical area, and the performance data representative of the one or more performance characteristics of the plurality of associated following vehicles, and the reorganization initiate signal.

16. The non-transitory computer-readable storage medium according to claim 15, wherein:
the receiving the performance capability signals comprises receiving braking performance capability signals from the plurality of associated following vehicles, the braking performance capability signals comprising braking performance data representative of braking capabilities of the plurality of associated following vehicles; and
the set of instructions comprises executing the set of instructions to generate the first lateral offset distance data and the first longitudinal overlap distance data in accordance with a predetermined combination of the global position data representative of the position of the associated leading vehicle relative to the associated geographical area and the braking performance data representative of the braking capabilities of the plurality of associated following vehicles.

17. The non-transitory computer-readable storage medium according to claim 15, further comprising:
transmitting to the first set of first and second following vehicles:
the first lateral offset distance data representative of a single lateral offset distance in a direction perpendicular to the forward path and offset on opposite sides of the forward path to be maintained in the non-linear platoon by each of the first and second vehicles of the first set relative to the forward path; and
the first longitudinal overlap distance data representative of a single longitudinal overlap distance in a direction along the forward direction to be maintained in the non-linear platoon by the each of the first and second vehicles of the first set relative to the leader vehicle.

18. The non-transitory computer-readable storage medium according to claim 15, further comprising transmitting, to a second set of third, fourth, and fifth following vehicles of the plurality of following vehicles:
a second lateral offset distance signal comprising second lateral offset distance data representative of second lateral offset distances in a direction perpendicular to the forward path and offset from the forward path to be maintained in the non-linear platoon by each of the third, fourth, and fifth following vehicles of the second set; and
a longitudinal gap distance signal comprising longitudinal gap distance data representative of longitudinal gap distances in a direction along the first direction to be maintained in the non-linear platoon by the each of the third, fourth, and fifth following vehicles of the second set relative to the first and second vehicles of the first set; and
executing the set of instructions to generate the second lateral offset distance data, the longitudinal gap distance data, and the reorganization initiation signal in accordance with a predetermined combination of the global position data representative of the position of the associated leading vehicle relative to the associated geographical area and the performance data representative of the one or more performance characteristics of the plurality of associated following vehicles.

19. The non-transitory computer-readable storage medium according to claim 18, further comprising:
receiving, by the plurality of associated following vehicles as the performance capability signals, braking performance capability signals, the braking performance capability signals comprising braking performance data representative of braking capabilities of the plurality of associated following vehicles; and
executing the set of instructions to generate the first lateral offset distance data, the first longitudinal overlap distance data, the second lateral offset distance data, the longitudinal gap distance data, and the reorganization initiation signal in accordance with a predetermined combination of the global position data representative of the position of the associated leading vehicle relative to the associated geographical area and the braking performance data representative of the braking capabilities of the plurality of associated following vehicles.

20. The non-transitory computer-readable storage medium according to claim 18, further comprising:
transmitting, to the first set of first and second following vehicles of the plurality of following vehicle and to the second set of third, fourth, and fifth following vehicles of the plurality of following vehicles:
an emergency brake command signal comprising emergency brake command data representative of deceleration command data selectively usable by the first and second sets of following vehicles to effect an emergency deceleration operation; and
an emergency brake command direction signal comprising emergency brake command direction data representative of deceleration command direction data selectively usable by the first and second sets of following vehicles to implement the emergency deceleration operation; and
executing the set of instructions to generate the emergency brake command data, and the emergency brake command direction data in accordance with a predetermined combination of the one or more conditions of the associated roadway and/or the associated geographical.

21. The non-transitory computer-readable storage medium according to claim 18, further comprising:
receiving, from the plurality of associated following vehicles as the performance capability signals, braking performance capability signals the braking performance capability signals comprising braking performance data representative of braking capabilities of the plurality of associated following vehicles; and
executing the set of instructions to generate the first lateral offset distance data, the first longitudinal overlap distance data, the longitudinal gap distance data, and the second lateral offset distance data in accordance with a predetermined combination of the global position data representative of the position of the associated leading vehicle relative to the associated geographical area and the braking performance data representative of the braking capabilities of the plurality of associated following vehicles.

* * * * *